(12) United States Patent
Rousseau et al.

(10) Patent No.: US 8,238,269 B2
(45) Date of Patent: Aug. 7, 2012

(54) METHOD FOR BALANCING LATENCY IN A COMMUNICATIONS TREE, CORRESPONDING DEVICE AND STORAGE MEANS

(75) Inventors: Pascal Rousseau, Rennes (FR); Tristan Halna Du Fretay, Rennes (FR); Yacine El Kolli, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 12/636,681

(22) Filed: Dec. 11, 2009

(65) Prior Publication Data
US 2010/0149985 A1 Jun. 17, 2010

(30) Foreign Application Priority Data
Dec. 17, 2008 (FR) ...................................... 08 58738

(51) Int. Cl.
*H04L 12/28* (2006.01)
*H04L 12/16* (2006.01)
*G06F 15/173* (2006.01)

(52) U.S. Cl. .................. 370/256; 370/260; 709/224

(58) Field of Classification Search .................. None
See application file for complete search history.

(56) References Cited

U.S. PATENT DOCUMENTS 6,631,410 B1 * 10/2003 Kowalski et al. ............. 709/224
6,697,365 B1 2/2004 Messenger
2004/0068588 A1 4/2004 Kowalski
2009/0067349 A1 * 3/2009 Glueckman et al. .......... 370/260

FOREIGN PATENT DOCUMENTS
EP 1 289 211 5/2003

OTHER PUBLICATIONS

French Search Report dated Aug. 4, 2009 issued during prosecution of related French application No. 0858738.

* cited by examiner

*Primary Examiner* — Clemence Han
(74) *Attorney, Agent, or Firm* — Fitzpatrick, Cella, Harper & Scinto

(57) ABSTRACT

A method is proposed for balancing a latency of transmission of data content in a communications tree in a synchronous communications network, the communications tree comprising a root node on which a junction terminal is connected, the communications tree comprising leaf nodes on which terminals are connected, the root node and the leaf nodes being interconnected by intermediate nodes, the nodes being interconnected by links. The method comprises determining, for each node of the communications tree, a maximum value of latency associated with each path going from said node up to leaf nodes in a direction opposite to the junction terminal, and applying to each link at a node, the link running from the node in the direction opposite to the junction terminal, a supplement of latency balancing that corresponds to a difference between a maximum value of latency of each link and a maximum value.

9 Claims, 25 Drawing Sheets

| Port ID | Link delay | Tree ID list |
|---|---|---|
| A | 1 | 1 |
| B | 4 | 1 |
| C | 4 | 1 |
| D | - | - |

| ID Port | Downlink traffic delay | Uplink traffic delay | Tree ID List |
|---|---|---|---|
| A | 1 | 1 | 1 |
| B | 4 | 3 | 1 |
| C | 2 | 4 | 1 |
| D | - | - | - |

Figure 7a

| Tree ID | State of the tree | Operating mode | Port ID | Type of Port | Port delay |
|---|---|---|---|---|---|
| TID 1 | Open | N-to-1 | A | North | - |
| | | | B | South | 18 |
| | | | C | South | 6 |

710

711 712 713 714 715 716

State of Tree:
Open
In Connection
Closed

Type of tree:
N-to-1 (Leaf-to-root)
1-to-N (Root-to-leaf)

Type of Port :
North
South
Root
Leaf

Figure 7b

| ID of Virtual Channel VC | I/O | Source Port | Source VC | Tree ID | Delay for balancing |
|---|---|---|---|---|---|
| 1 | O | B | 1 | TID 1 | 0 |
| 2 | O | C | 2 | TID 1 | 0 |
| 3 | O | C | 3 | TID 1 | 0 |
| 4 | - | - | - | - | 0 |
| 5 | ... | - | - | - | 0 |
| i | ... | - | - | - |  |
| ... | ... | - | - | - | 0 |
| ... | ... | - | - | - |  |
| N | - | - | - | - | 0 |

801 802 803 804 805 806

800

Port A

Figure 8

METHOD FOR BALANCING LATENCY IN A COMMUNICATIONS TREE, CORRESPONDING DEVICE AND STORAGE MEANS

1 FIELD OF THE DISCLOSURE

An embodiment of the invention pertains to synchronous TDM (Time Division Multiplex) multimedia communications networks, and more particular to a network adapted to the simultaneous presentation either of a piece of information on several terminals or of several pieces of synchronous information on one and the same terminal.

2 TECHNOLOGICAL BACKGROUND

The technical field of this disclosure pertains to multimedia communications networks and more particularly to TDM (Time Division Multiplexing) type synchronous networks and isochronous networks.

The term "synchronous networks" is used when the clocks of a network are strictly synchronized in phase and in frequency with a reference clock. For example, we may refer to SDH (Synchronous Digital Hierarchy) type telecommunications networks or audio/video home networks for large-scale consumption based on the interconnection of several IEEE Std 1394a-2000 type buses as defined by the IEEE1394.1-2004 standard (Standard for High Performance Serial Bus Bridges).

It must be noted that should there be a constant relative phase difference observed, the term used is then "mesochronous networks" although, loosely speaking, these two types of networks are also called synchronous networks.

A TDM (Time Division Multiplexing) type network for its part is a network used to convey several channels or a same communications medium (the term used is "channel aggregation") by using time division multiplexing on the elementary samples of each of these channels. Thus, the time is divided into time slots of equal and fixed duration, successively intended for the different channels to convey an elementary sample. A TDM frame has one time slot per channel conveyed by the communications medium. The cycle is repeated with a new TDM frame comprising new elementary samples for each of the channels.

A synchronous TDM type networks therefore benefits from the features and properties of a TDM type network and a synchronous type network.

An isochronous network is a synchronous network which, like the IEEE Std 13948-2000 bus, is characterized by its capacity to transmit elementary samples having a different size per channel but being fixed in time at an appropriate frequency in order to obtain constant information bit rate. It can therefore be deemed to be the case that a synchronous TDM network is an isochronous network for which all the elementary samples have the same size and the same frequency of appearance in the communications medium.

An embodiment of the invention relates more particular to a synchronous network suited to the simultaneous presentation of either one piece of information on several terminals (1-to-N) type applications or to several pieces of synchronous information coming from several terminals addressed to a common terminal (N-to-1) type application.

An embodiment of the invention can be applied very particularly in a multi-camera capture system or in a distributed display system.

In order to obtain a simultaneous presentation of a multimedia stream in a network of terminals having wire and/or radio interfaces, the US patent US2004/0068588 describes a method for determining a delay to be applied to each of the interfaces connected to the multimedia stream rendering device.

The delay introduced by the use of a memory is determined as a function of the latency and end-to-end bandwidth characterizing the multimedia stream to be presented synchronously for each interface connected to the multimedia stream rendering device.

This solution calls for the presence of a memory for each interface connected to a device for rendering the multimedia stream enabling the introduction of a delay, a memory whose size varies with the differences of characteristics between the different communications networks but also with the architecture of the network. Now, in the presence of a network architecture that becomes complex, the size of the memory used to introduce the delay may prove to be insufficient or difficult to size. Furthermore, this method does not seek to minimize the comprehensive use of memory resources in the network. Thus, two interfaces each connected to a rendering device having a latency and end-to-end bandwidth characteristics that are identical for a multimedia stream must each apply a same delay.

Furthermore, this approach does not resolve the problem of the conveyance of several multimedia streams in order to present them synchronously to a common rendering device.

The patent EP1289211 describes a solution aimed at setting up end-to-end connections with a pre-determined value of latency by configuring the traversal time (latency) of the infrastructure apparatuses of the "bridge" type network, known as parametrizable devices. This solution meets the problem of the minimizing of the overall use of memory resources in the network but it has limits and provides no response to the problem of conveying several media streams in order to present them synchronously to a common rendering device.

It can be noted that the limits of this latter approach necessitate the setting up of a method for determining the topology of the network with discovery of the infrastructure apparatuses of the network supporting an embodiment of the invention. These infrastructure apparatuses known as parametrizable apparatuses have solely two communications ports.

Finally, the delays introduced by these infrastructure apparatuses called parametrizable are applied to all the traffic traversing these apparatuses without distinction. This therefore unnecessarily increases the latency of the traffic that does not necessitate the implementation of an embodiment of the invention and therefore prohibits a second parametrization for a second stream for which another synchronization would be necessary.

An embodiment of the invention described here below in the document therefore aims at resolving at least one of the unresolved problems of the prior art here above.

Thus, we shall describe a method known as latency balancing in a synchronous communications tree for N-to-1 type applications (for N sources to one destination, for example a multi-camera capture application) or a 1-to-N type applications (for one source towards N destinations, such as for example a distributed display application).

In order to make the present solution robust as regards the failure of a piece of equipment of the prior art controller type, this solution relies on the cooperation of the infrastructure apparatuses of the network which take part in the distribution of the streams or streams to be conveyed in the network.

Furthermore, an embodiment of the invention is aimed at supporting several applications of the disclosure for different communications trees on the same communications network.

An embodiment of the invention pertains to a method for balancing a latency of transmission of at least one data content in a communications tree defined in a synchronous communications network, the communications tree comprising a root node to which there is connected a junction terminal which is a convergence terminal in the context of a capture application and a divergence terminal in the context of a broadcast application. The communications tree furthermore comprises leaf nodes to which there are connected capture terminals in the context of a capture application and broadcast terminals in the context of a broadcast application, the root node and the leaf nodes being interconnected by intermediate nodes, the nodes being interconnected by links, wherein it comprises steps consisting in:

determining, for each node of the communications tree, a maximum value of latency associated with each path going from said node up to leaf nodes in a direction opposite to the junction terminal, and applying to each link at a node, the link running from the node in the direction opposite to the junction terminal, a supplement of latency balancing that corresponds to a difference between the maximum value of latency of said each link and the maximum value of latency which is the greatest value from among said maximum values of latency determined.

Thus, the balancing is distributed over several nodes of the network, providing all the flexibility needed to work iteratively, by thus distributing the processing load. In particular, it is possible to easily obtain changes in the topology of the communications tree, since each node can report a change of the latency time of a link which would have changed or again can report a modification of a data circuit.

From this point of view, a link is an entity constituted by a physical bond between two nodes and by circuits serving as output and input memory buffers. The adjusting of the latency therefore can be done either in the buffers or even distributed over both of them or else again done in a relay at an intermediate point of the link.

It will be noted that the term intermediate node is understood to mean a switch 200 (FIG. 2a) of the communications tree which is not the root node (i.e. the node to which the convergence or divergence terminal is connected) and which is not a leaf node.

It can be noted that the method can be applied equally well to broadcasting communications also called 1-to-N type communications as well as to N-to-1 type convergence communications also called N-to-1 type communications.

Thus, in a broadcasting mode, a piece of data captured (for example by a camera) at an instant T1 at the level of a source terminal will be available at a first destination terminal (connected to a leaf node) at the same point in time T2 at which it will be available at the level of a second destination node (connected to a leaf node).

Thus, in a convergence mode, a piece of data captured (for example by a first camera) at an instant T3 at the level of a first source terminal will be available at the level of the destination terminal (directly or indirectly connected to the root node) at the same instant T4 as another piece of data has been captured (for example by a second camera) at the instant T3 at a second source terminal.

Furthermore, in convergence mode, it is especially possible to collect sub-sets at intermediate nodes from among the total of the data streams coming from the terminals connected to the leaves (i.e. to the sources) since these latencies of sub-sets will have been balanced, thus providing for a time of synchronous presentation of these data streams in an intermediate node situated between the leaf nodes (to which the source terminals of the streams considered are connected) and the root node (convergence node).

It will be noted that the acquisition of the latency values for each node can be done following a request intended to set up a balanced tree or else it can be done cyclically, so as to then store the values received in return and thus be able to respond immediately to a balancing request.

The exchanges between nodes may be of the PULL type or of the PUSH type. In the former case, each node interrogates its neighbors on the leaf side (i.e. in the ones that are in the direction opposite to the root node) by a query asking to know their maximum value of latency and, in the latter case, each node spontaneously sends its maximum value of latency on the link to the neighboring node on the root side (i.e. towards the root node).

Preferably, the steps for determining a maximum value of latency and for applying a supplement of supplement of latency balancing are performed by successive nodes, in working back from the leaf nodes to the root node.

The nodes are thus activated in a cascade, thus preventing the duplication of queries.

In convergence node, it is by starting with the leaves and going back to the root node of the communications tree that a compensation already begins to be made, locally at an intermediate node considered, for the time-shift or time-lag between the streams injected into the communications tree by the leaf nodes. This furthermore makes it possible to distribute the load of each of the supplements of latency balancing among these different nodes of the tree.

According to one practical embodiment, the method comprises a preliminary step for sending a command to said leaf nodes, from a root node, for activating latency balancing of the communications tree.

Thus, each of the intermediate nodes can determine which of its links is directly or indirectly connected to the root node. Indeed, this link corresponds to the one by which the activation message reaches it.

In one mode of implementation, in order to perform the step of determining a maximum value of latency, the method comprises steps of, from each intermediate node:

sending a query (DELAY QUERY), on its links in a direction opposite to the convergence terminal or the divergence terminal, for obtaining said maximum value of latency;

sending a message comprising a maximum value of latency determined as a function of at least one response to said query or queries, said message being sent on the link from said node towards the convergence terminal or the divergence terminal.

Thus, by sending simple query/response type messages, the nodes can determine from one node to the next the value of latencies applicable to each of the links of the communications tree.

In particular, it can be provided that the method, in order to perform the step of applying a supplement of latency balancing, will comprise a step which, for at least some of the links, will consist in applying the supplement of latency to a link output with respect to a direction of transmission of said content.

It must be noted that with respect to one direction of a stream, one link input corresponds to the output port of one of the nodes to which the link refers. Thus it is possible to use node architectures having available a reserve of memory solely on the output ports.

It can also be provided that the method, in order to perform the step of applying a supplement of latency balancing, will comprise a step, for at least certain of the links, of applying the supplement of latency to a link input with regard to a direction of transmission of said content or contents.

It must be noted that with respect to a stream direction, a link output corresponds to the input port of one of the nodes to which the link refers. Thus, it is possible to use architectures of nodes having available a memory reserve solely at the input ports.

Thus, the supplement of latency is applied all or in part to any one of the ends of the link. Certain nodes may thus require only little memory for this purpose.

Advantageously, in order to perform the step of applying a supplement of latency balancing, the method comprises preliminary steps which, for a considered node of each of said certain links, are steps of determining the direction of transmission of said content and, depending on the determined direction of transmission, of:

locally applying the supplement of latency balancing to said considered node, or sending a command for application of the supplement of latency balancing intended for the node interconnected to said node considered by the link.

Thus, an intermediate node having determined the supplement of latency to be applied to a given link may, according to the architecture of the node (having available a memory reserve solely at the input ports or solely at the output ports), decide to locally apply the supplement of latency or have it applied by the node with which it is connected by the given link.

In another embodiment, the disclosure pertains to a storage means, readable by computer, storing a computer program comprising a set of instructions executable by a computer to implement the above-mentioned method (in any one of its different embodiments).

An embodiment of the invention also pertains to a device constituting a communication node of a synchronous communications network designed to undergo a latency balancing of transmission of at least one data content in a communications tree defined in a synchronous communications network, the communications tree comprising a root node to which there is connected a junction terminal which is a convergence terminal in the context of a capture application and a divergence terminal in the context of a broadcast application, the communications tree furthermore comprising leaf nodes to which there are connected capture terminals in the context of a capture application and broadcast terminals in the context of a broadcast application, the root node and the leaf nodes being interconnected by intermediate nodes, the nodes being interconnected by links, wherein the communication node comprises:

means for determining a maximum value of latency associated with each path going from said node up to leaf nodes in a direction opposite to the junction terminal, and means for applying to each link at a node, the link running from the node in the direction opposite to the junction terminal, a supplement of latency balancing that corresponds to a difference between the maximum value of latency of said each link and the maximum value of latency which is the greatest value from among said maximum values of latency determined.

3 DESCRIPTION OF ONE EMBODIMENT OF THE INVENTION 3.1 List of Figures

Other features and advantages of the invention shall appear from the following description, given by way of a non-restrictive indicative example, and from the appended drawings, of which:

FIG. 7a is a configuration table for a switch

FIG. 7b is a table of communications trees of a switch

FIG. 8 is a configuration table for a port

Figure 1A:
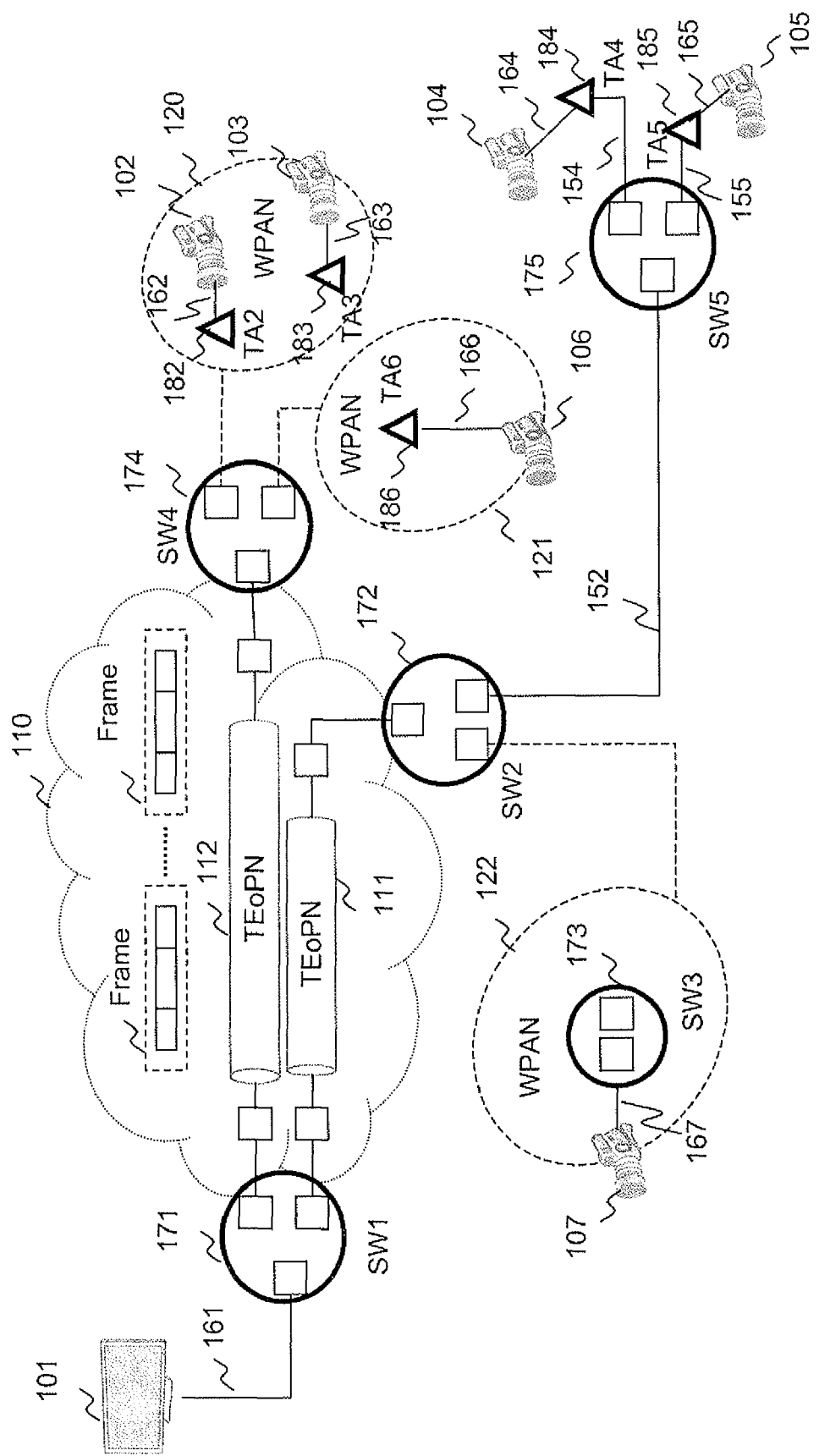
FIG. 1a shows a communications system for a capture application
Figure 13:
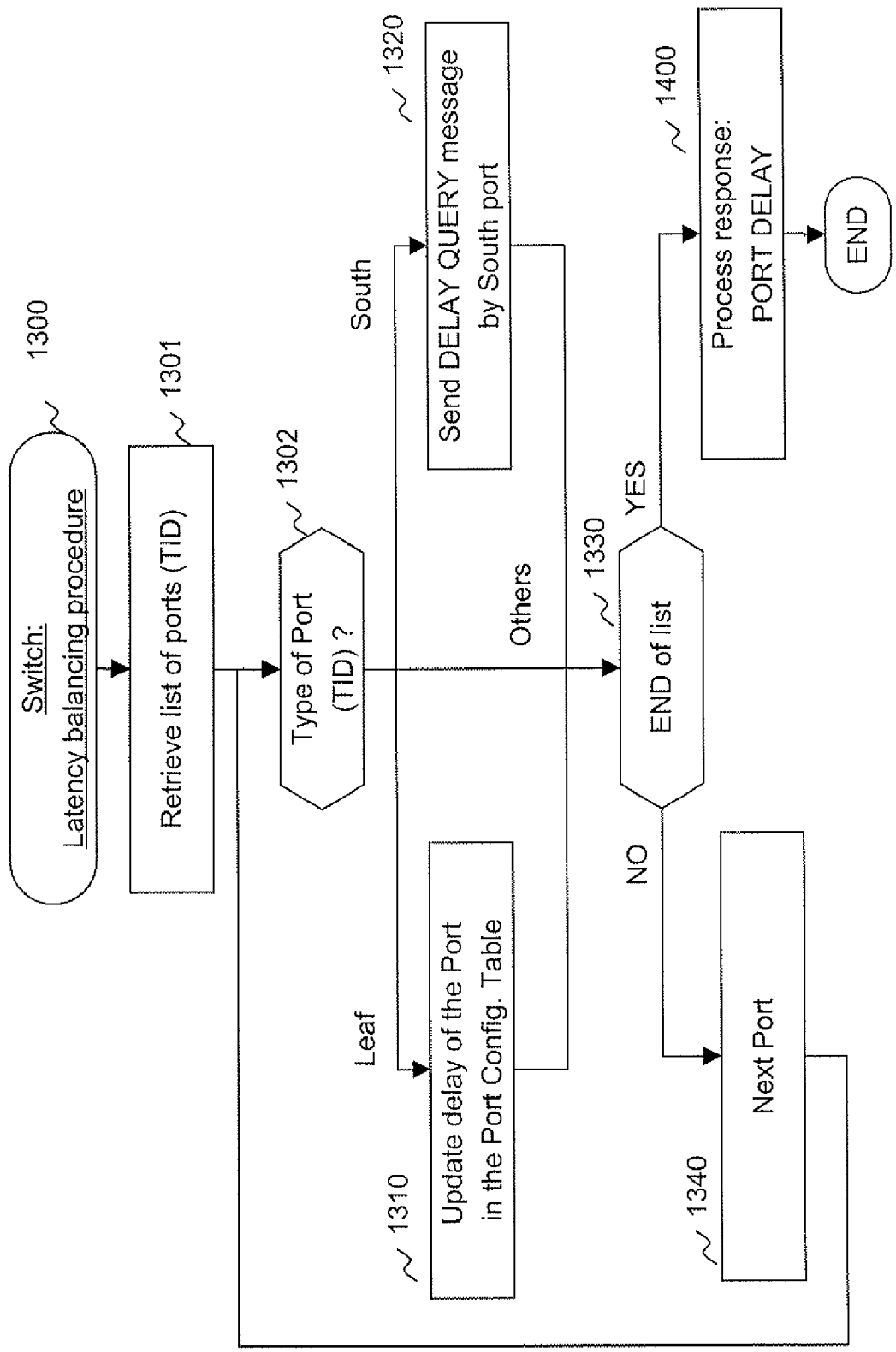
Figure 14:
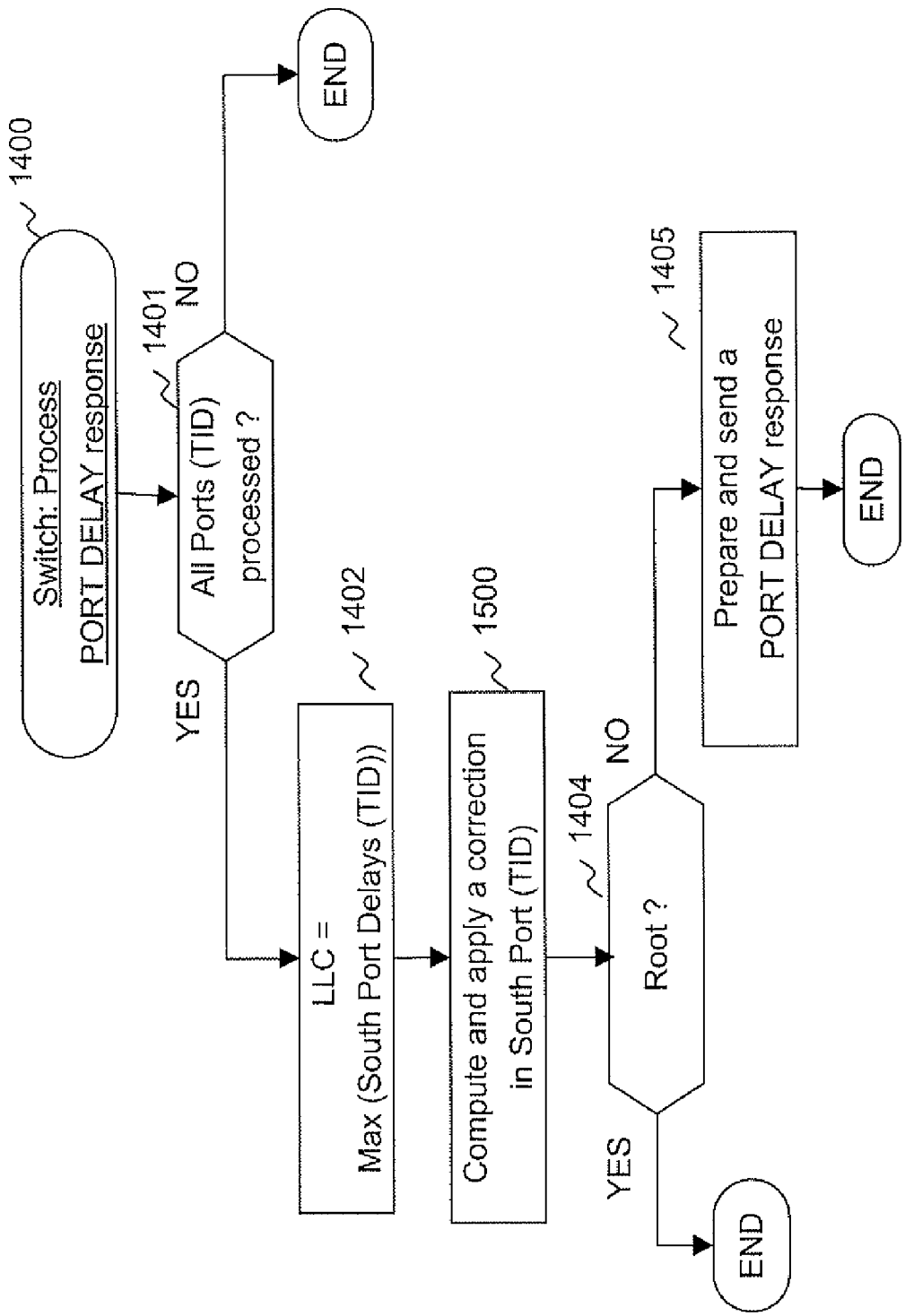
Figure 15:
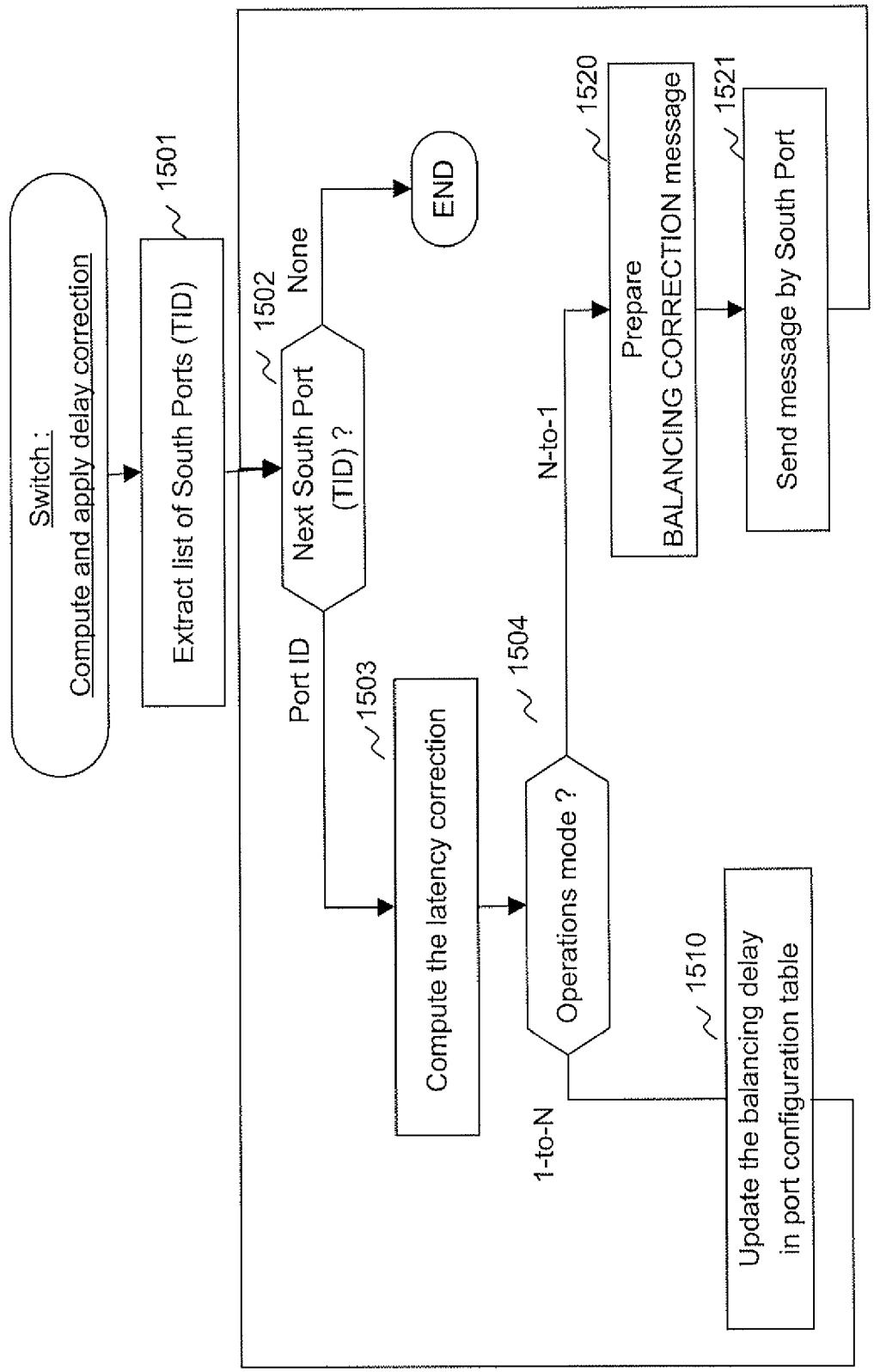
Figure 16:
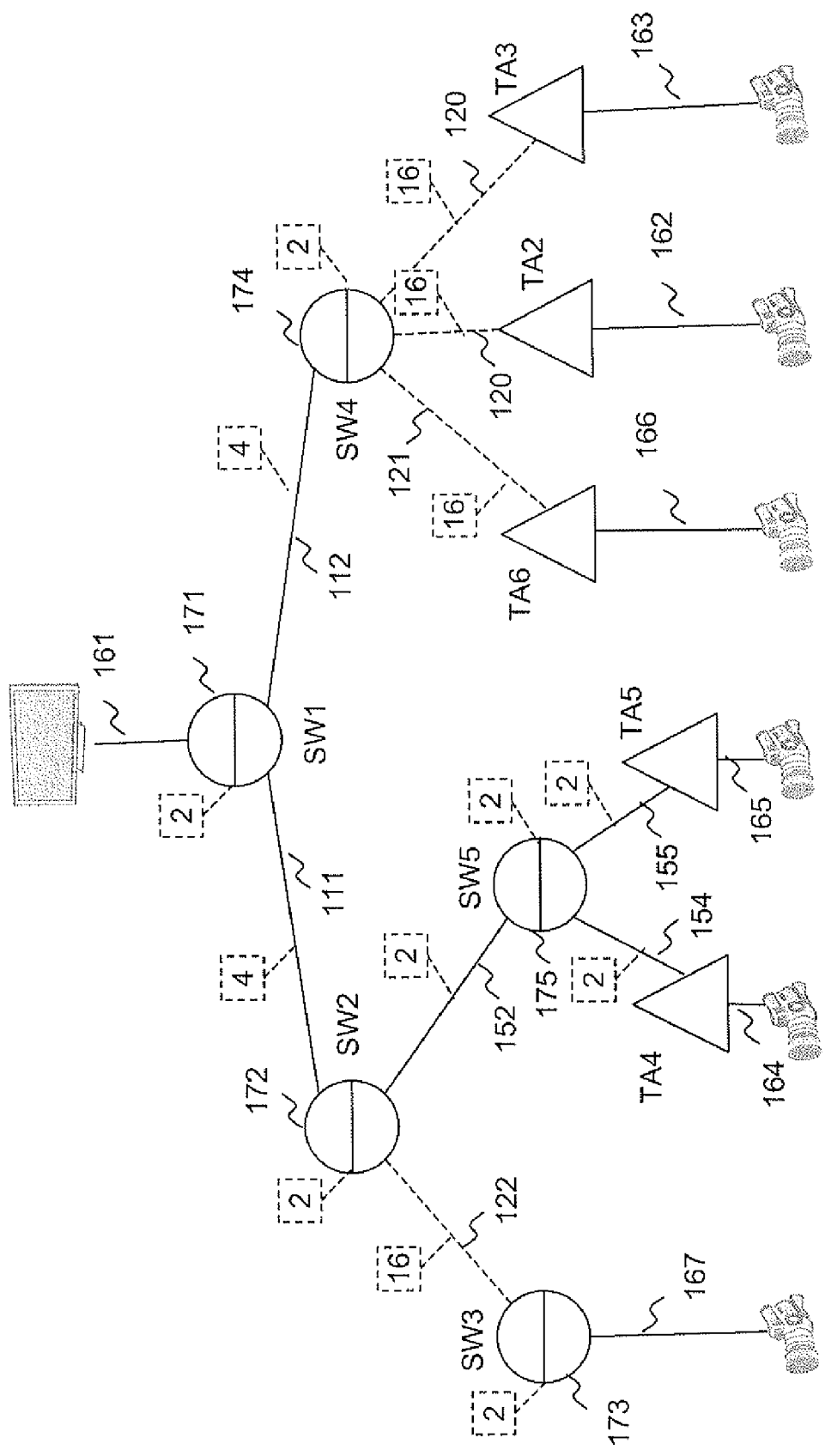
Figure 17:
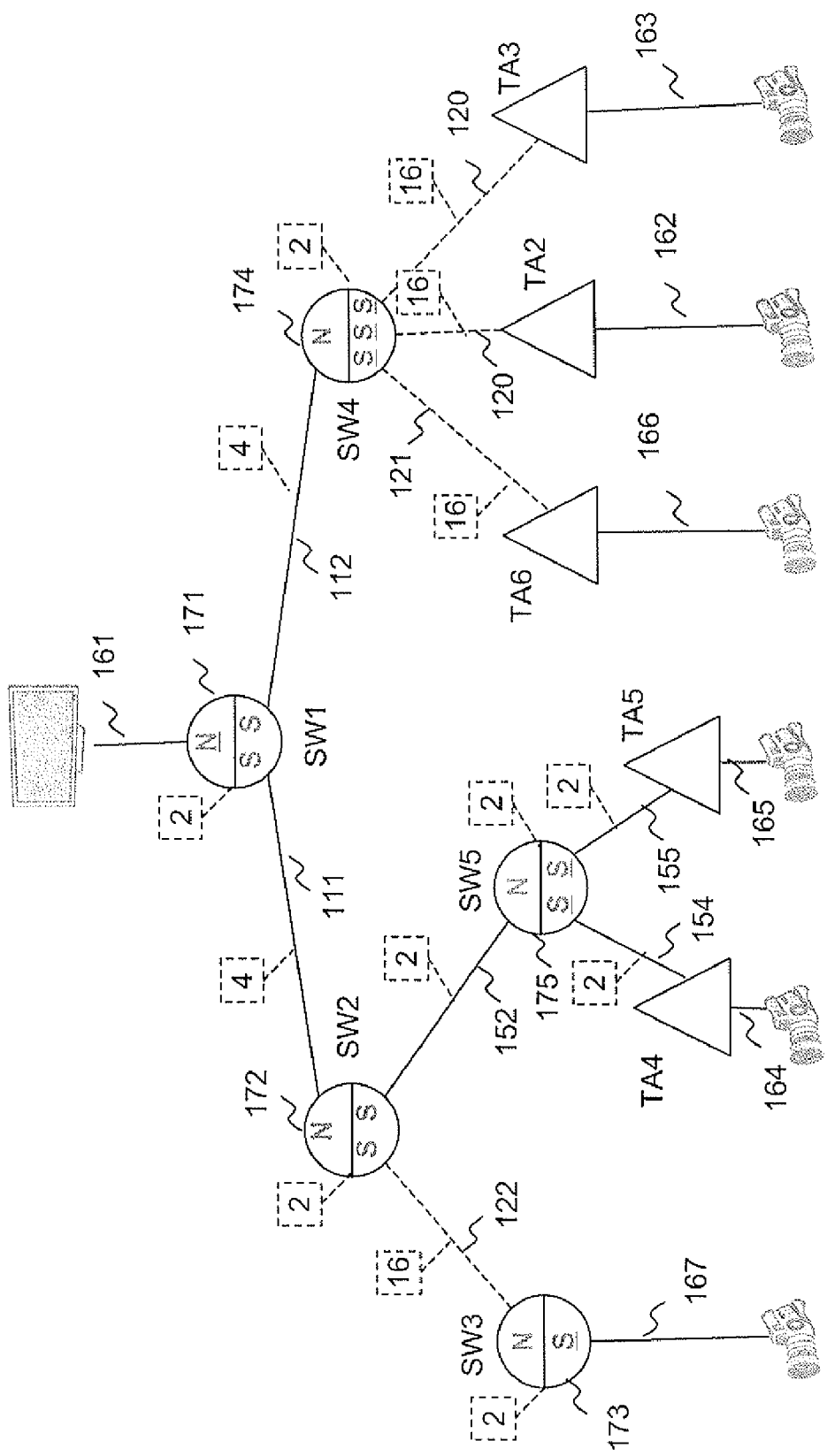
Figure 18:
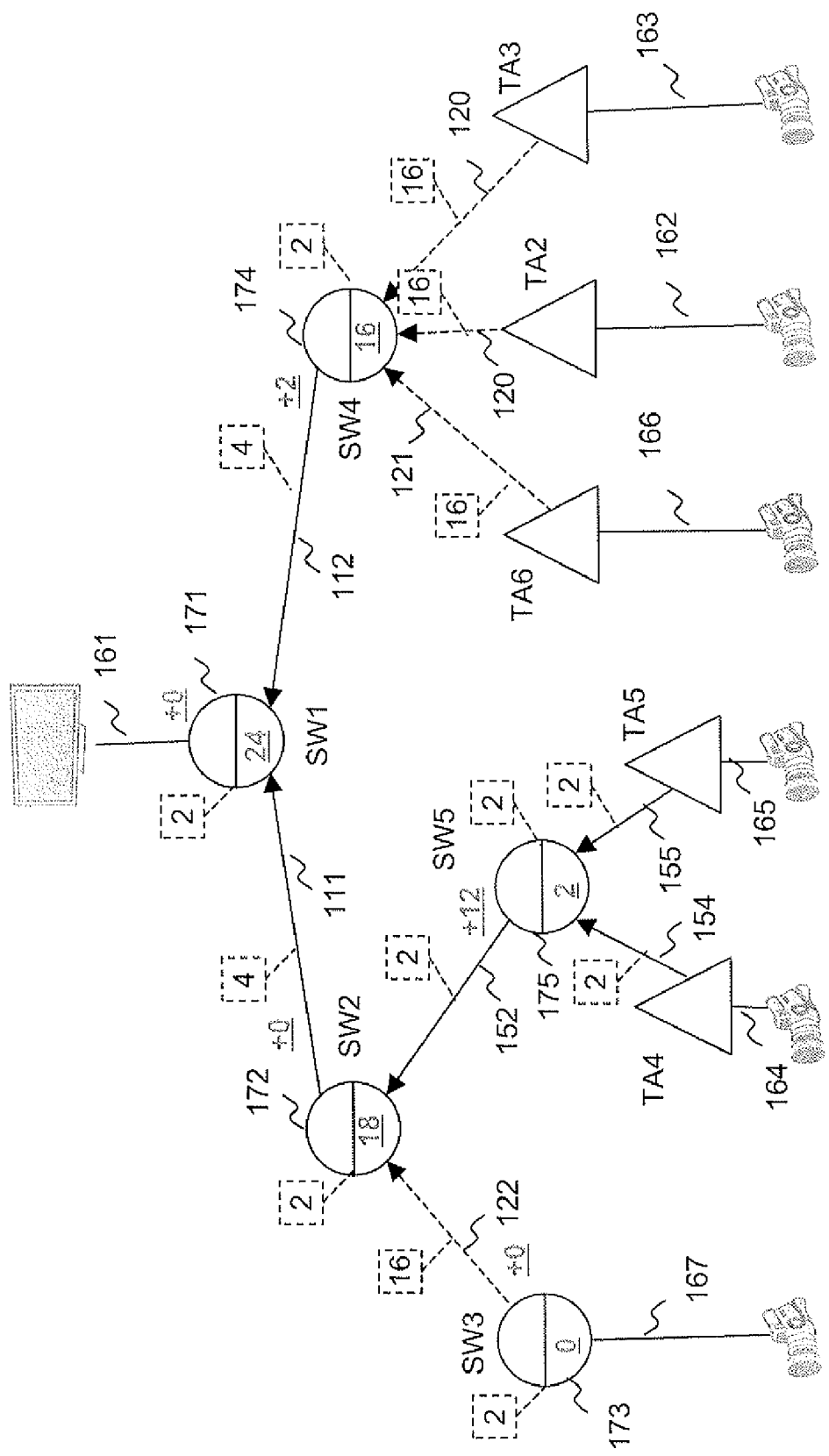
Figure 19:
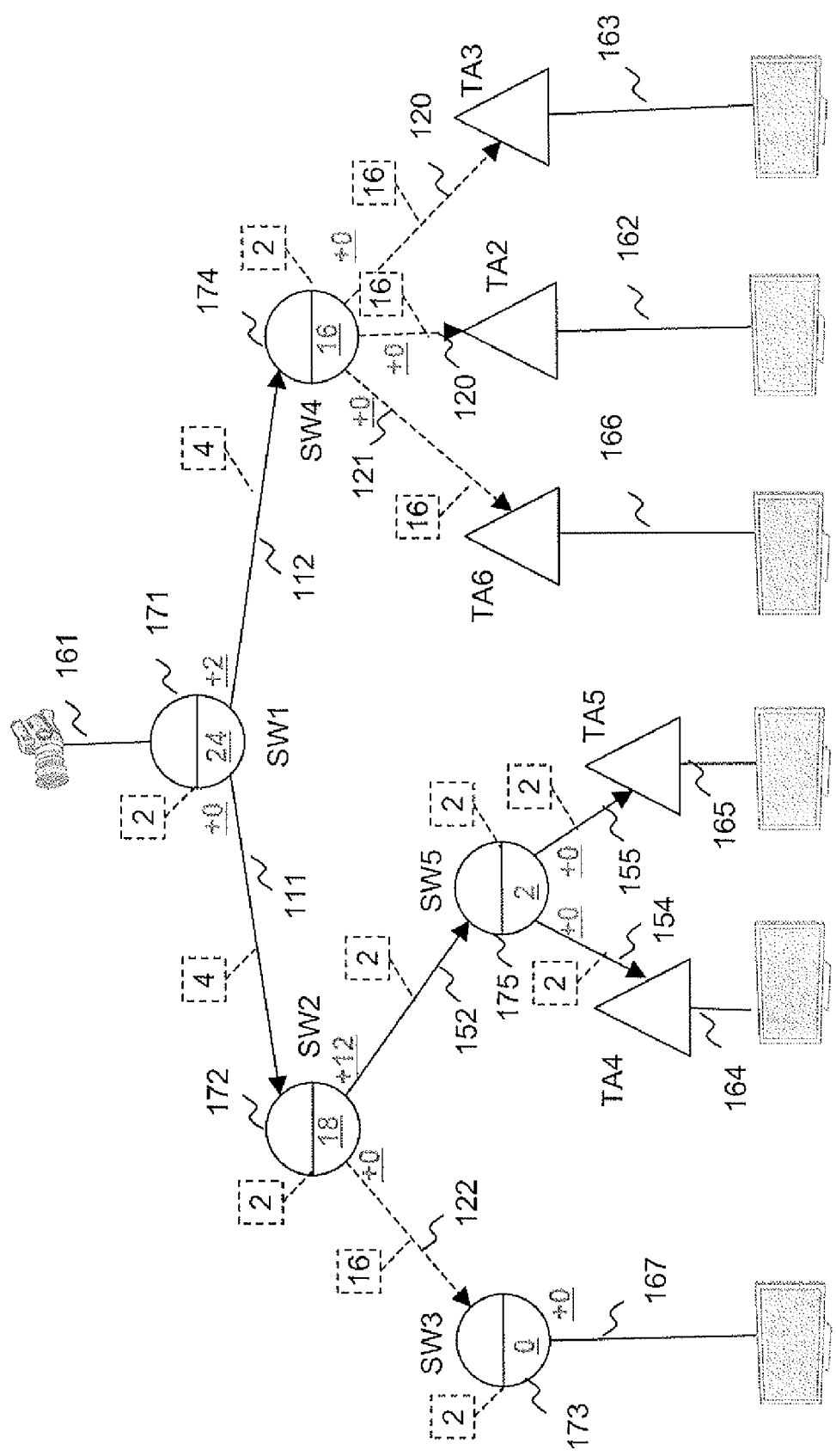
Figure 20:
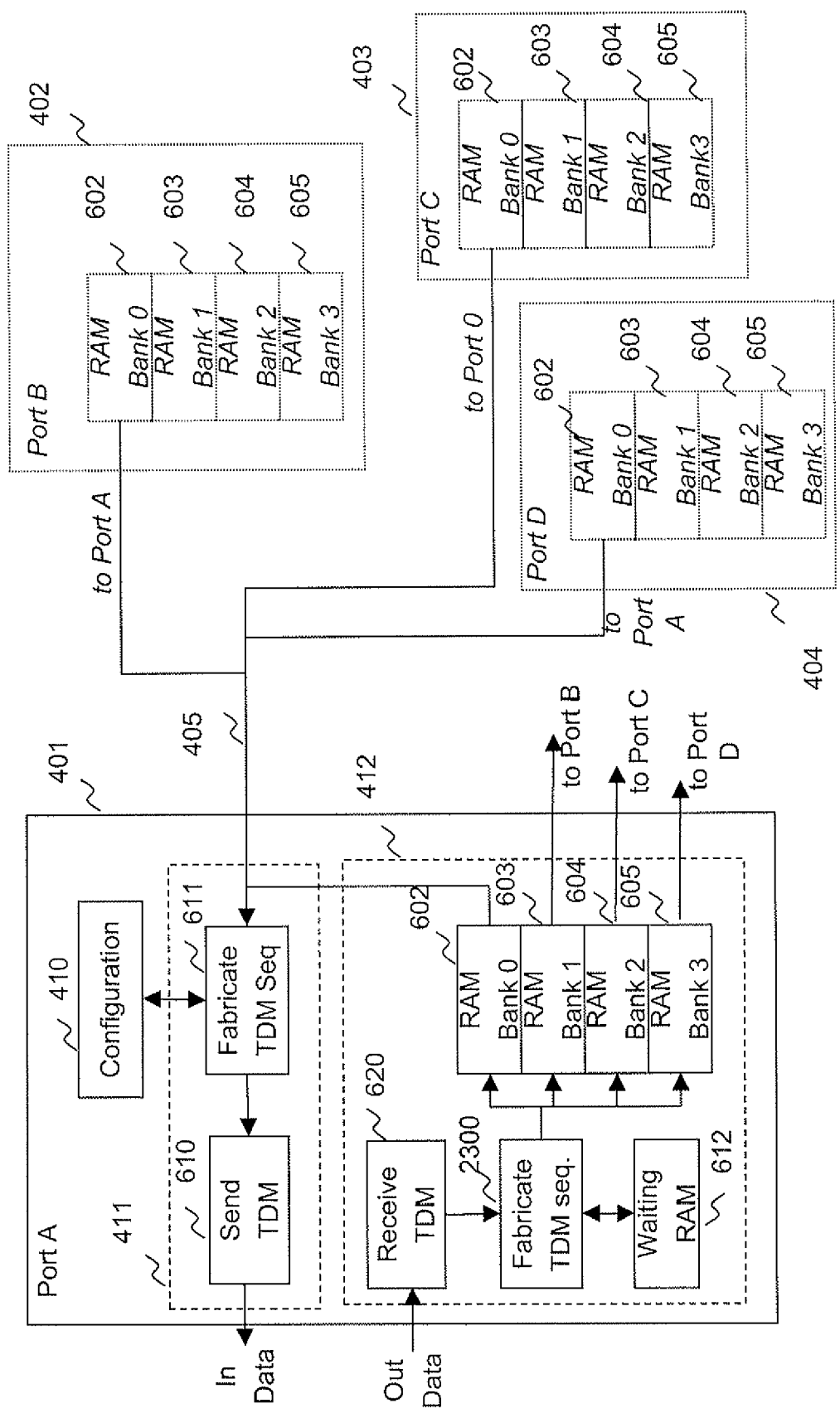
Figure 21A:
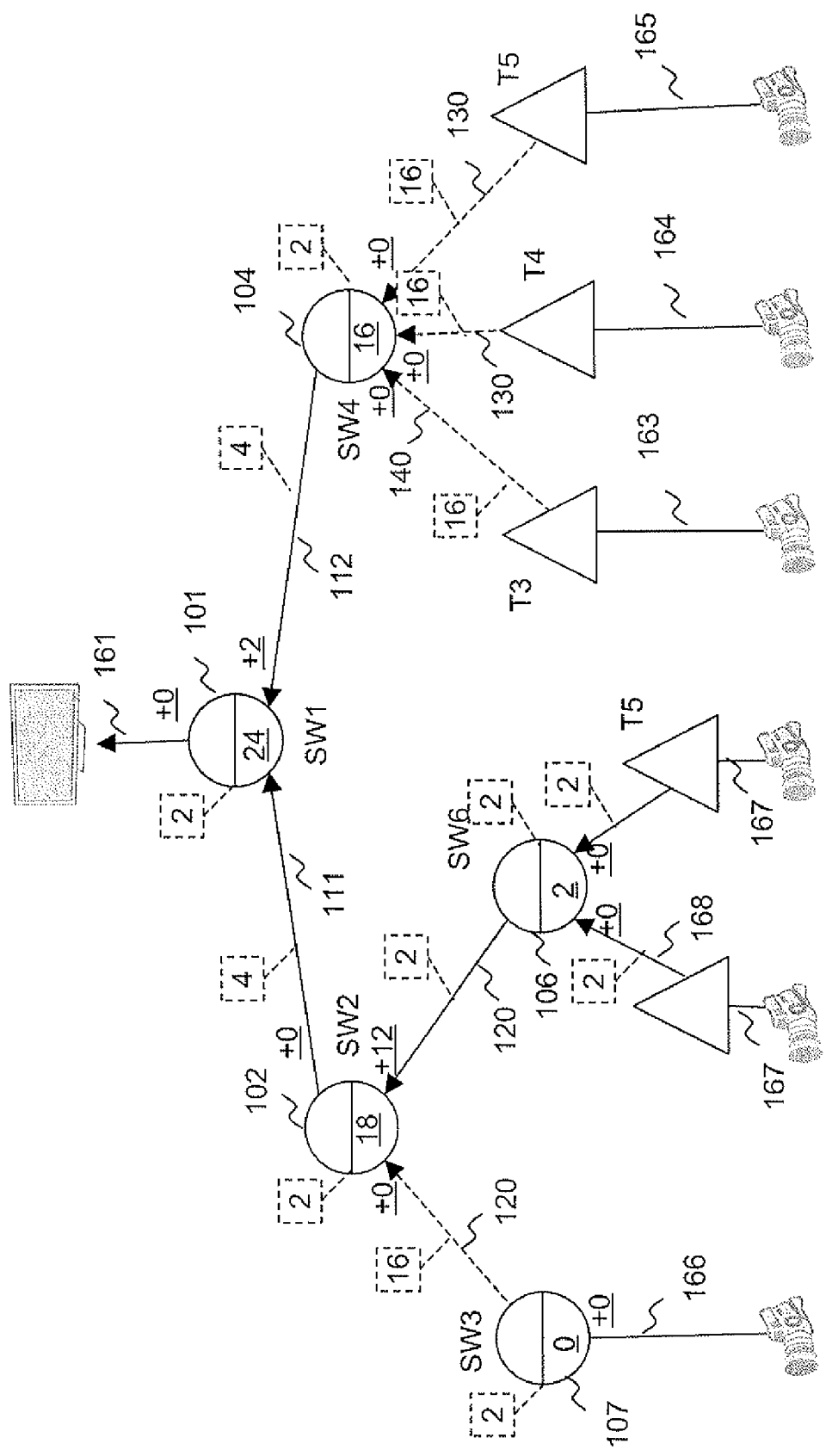

FIG. 13 is a flowchart illustrating the consolidation of the latencies of the ports FIG. 14 is a flowchart for the processing of a PORT DELAY response FIG. 15 is a flowchart illustrating the computation and application of a supplement of latency FIG. 16 is a graph illustrating the network of FIG. 1a FIG. 17 is a block diagram illustrating the typing of the ports of the switches FIG. 18 is an illustration of maximum latencies (locally at each intermediate and root node), LLC, and of latency supplements added for an N-to-1 configuration, FIG. 19 is an illustration of maximum latencies (locally at each intermediate and root node), LLC, and of latency supplements added for an N-to-1 configuration, FIG. 20 is a block diagram illustrating a latency adjustment memory at a switch input port, FIG. 21a illustrates the maximum latencies (locally at each intermediate and root node), LLC, and latency supplements added at a switch input port, in the context of a convergence mode.

Figure 21B:
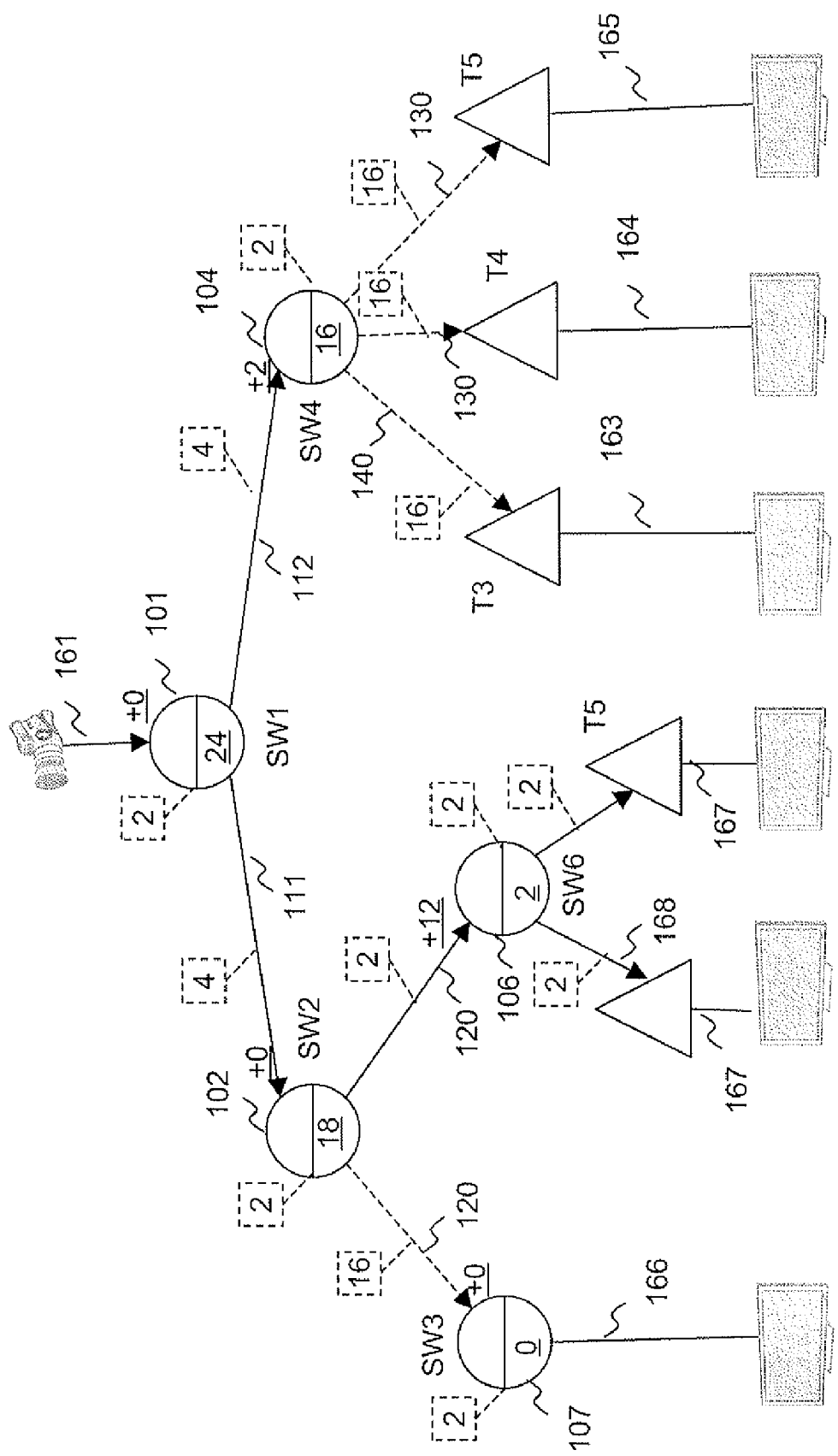

FIG. 21b illustrates the maximum latencies (locally at each intermediate and root node) LLC and latency supplements added to a switch input port, in the context of a convergence mode.

3.2. IMPLEMENTATION OF THE DISCLOSURE

Figure 1B:
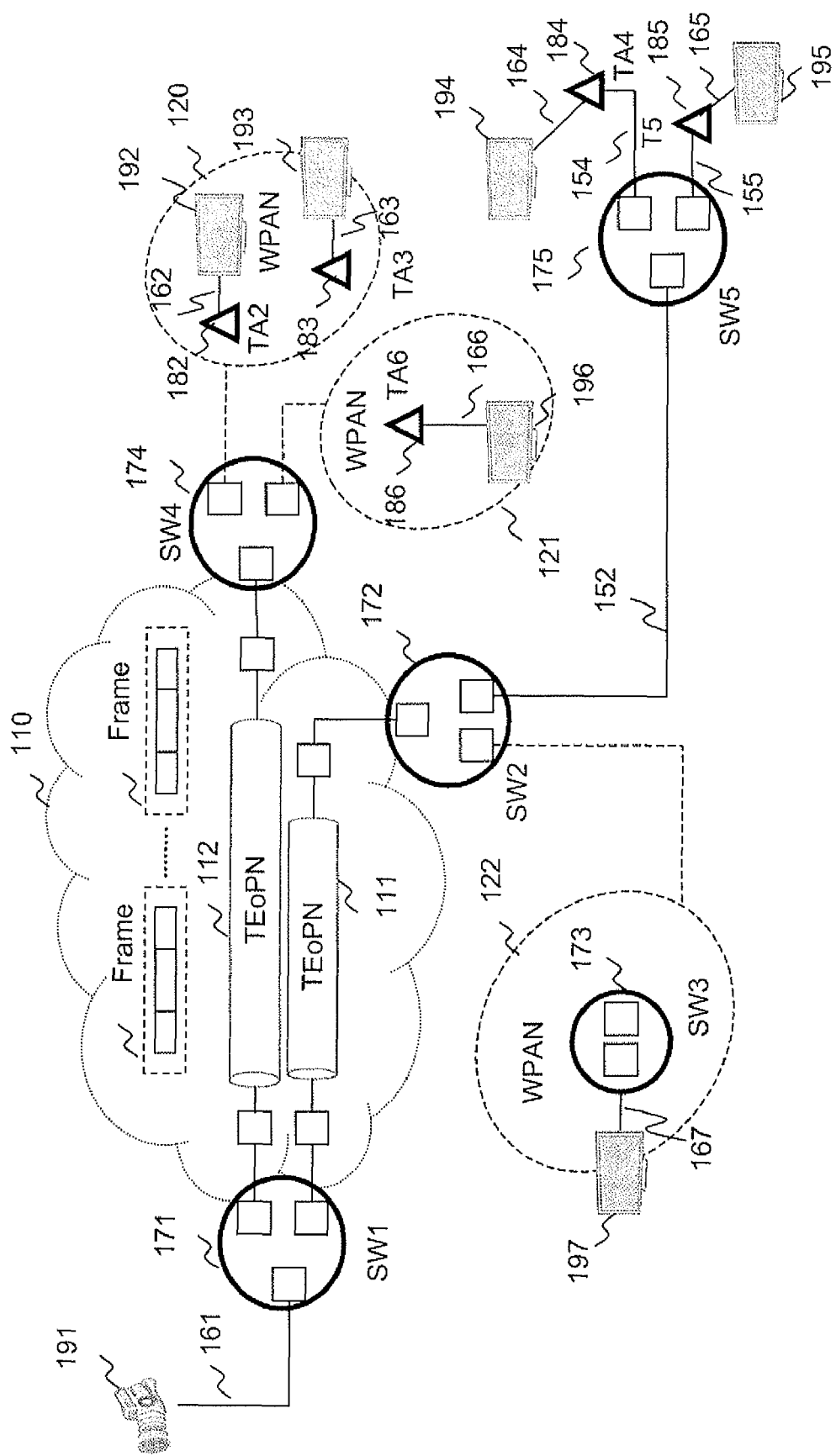
FIG. 1b shows a communications system for a broadcasting application

FIGS. 1a and 1b illustrate the use of a communications system called a TDM network implementing an embodiment of the invention that will be described here below through two applications.

FIG. 1a illustrates a synchronous digital multi-camera capture system (of the N-to-1 type). This system has capture apparatuses referenced 102, 103, 104, 105, 106 and 107 which produce a set of audio-video streams that are directed towards a single viewing apparatus 101 that could also comprise storage capacities to record these streams. The apparatus 101, in the context of an N-to-1 type system (or application) is called a convergence apparatus (or terminal). The switch to which it is connected is the root switch (or node) of the communications tree.

To enable the distribution of these streams, the apparatuses 101 to 107 are connected to a TDM (Time Division Multiplexing) type network by means of audio-video connections 161, 162, 163, 164, 165, 166 and 167 such as for example HDMI (High Definition Multimedia Interface).

A TDM network enables one or more sender nodes to make transmission in one or more digital channels of a same shared communications medium by the time-interlacing of the samples of each of these channels.

FIG. 1b for its part illustrates a system of audio/video broadcasting offering a synchronous presentation (of the 1-to-N type). More particularly, this system enables the broadcasting of an audio/video stream coming from a capture apparatus 191 through a TDM type network such as that of the system described with reference to FIG. 1a intended for a plurality of display apparatuses 192, 193, 194, 195, 196 and 197. The apparatus 191, in the context of a 1-to-N type system (or application) is called a convergence apparatus (or terminal). The switch to which it is connected is the root switch (or node) of the communications tree.

These display and capture apparatuses 191 to 197 also use audio/video connections 131 to 137 such as for example HDMI, providing for their connectivity to the TDM type network.

Thus, the TDM network shown in FIGS. 1a and 1b is formed by TDM sub-networks 110, 120, 121, 122 of the infrastructure apparatuses namely the switches SW1, SW2, SW3, SW4 and SW5 respectively referenced 171, 172, 173, 174 and 175, adaptors TA2, TA3, TA4, TA5 and TA6 respectively referenced 182, 183, 184, 185 and 186 and finally interconnection links 152, 154 and 156 (InterConnect). The switches and the adaptors are more generally called (communications) nodes. These nodes enable a point-to-point link between two switches such as the link 152 between SW2 and SW5 or between a switch and an adaptor such as the links 154 and 155 between the switch SW5 and the adaptors TA4 and Ta5 respectively. These interconnections links shall be described in greater detail with reference to FIG. 5.

Furthermore, the TDM sub-networks 120, 121 and 122 are personal type radio networks (PANs or Personal Area Networks) supporting the TDM communications, or wireless local area networks (WLANs) implementing a TDM Circuit Service Emulation or CSE.

The TDM sub-network 110, in the example of FIGS. 1a and 1b is built from a packet network infrastructure such as for example a Gigabit Ethernet in which a TDM service emulation is implemented, enabling the setting up of two virtual interconnection links 111 and 112 having a constant latency between the switch SW1 on the one hand and the switches SW2 and SW4 respectively on the other hand.

It must be noted that the architecture of the network described with reference to FIGS. 1a and 1b is given by way of an illustration and is no way restricts the implementation of an embodiment of the invention.

It is also clear that the apparatuses 102 to 106 and 192 to 196 can integrate the adaptors TA2 to TA6. Furthermore, the apparatuses 101 and 107 on the one hand as well as 191 and 197 on the other hand can respectively integrate the switches SW1 and SW2 to provide native connectivity to the sub-networks 110, 120, 121 and 122 or to the interconnection links 154 and 155.

Figure 2A:
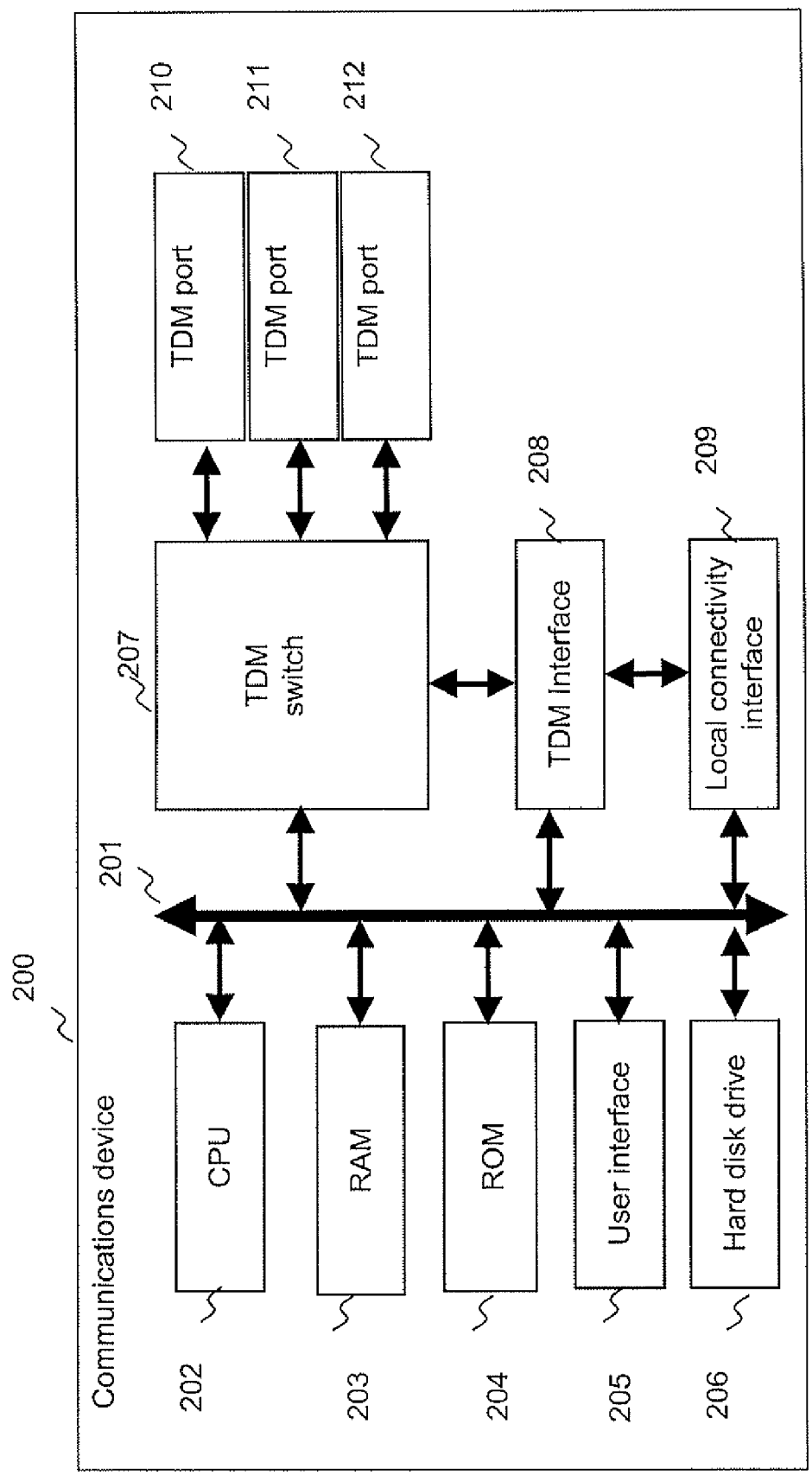
FIG. 2a shows a drawing of a switch-type device

Referring to FIG. 2a, a description is provided of a communications device 200 which integrates an embodiment of the invention as implemented in the switches SW1, SW2, SW3, SW4 and SW5 respectively referenced 171 to 175 in FIGS. 1a and 1b.

This communications device adapted to an embodiment of the invention therefore has an internal bus 201 enabling an exchange of information between the components referenced 202 to 207. A central processing unit 202 enables the execution of the instructions of a program saved in a non-programmable memory 204 or on a non-volatile storage system such as for example a hard-disk drive 206. This program contains especially all or part of the steps described in the flowcharts that describe this embodiment of the invention and are illustrated here below.

Furthermore, the non-volatile memory 206 contains configuration data elements which can be updated by the operator using an interface 205. The random access memory (RAM) 203 is the main memory of the central processing unit 202 which therein executes the instructions of the program after their transfer from the non-programmable memory 204 or from the non-volatile memory 206 after the system has been powered on.

Finally, this device has a local connectivity interface 209 available, laid out so as to connect the audio/video apparatuses such for example an HDMI interface. It also has extended connectivity towards the TDM network by means of an interface module 208 which shapes the information to be exchanged between the internal bus (coming from or addressed to an application that is executed on the central processing unit 202 or the local connectivity interface) and the communications ports 210, 211 and 212 for communication with the TDM network. The switching module 207 especially performs operations of filtering and setting up circuits between the communications ports 210, 211 and 212 and the interface module 208 (routing). The switching module 207 is of course configurable by the central processing unit 202 through the internal bus 206.

It must be noted that the interface module 208 is a communications port that enables the matching of traffic (for example through segmentation and re-assembling operations) with the applications while the communications ports 210, 211 and 212 shape the traffic to send and receive information adequately on a medium.

Finally, the number of communications ports as well as the number of interface modules 208 and the present description, respectively set at 3 and 1, are not restrictive and should be sized as a function of the characteristics of the system.

Here below in the document, we shall use the terms switch and switch-type communications device without distinction as described with reference to this figure.

Figure 2B:
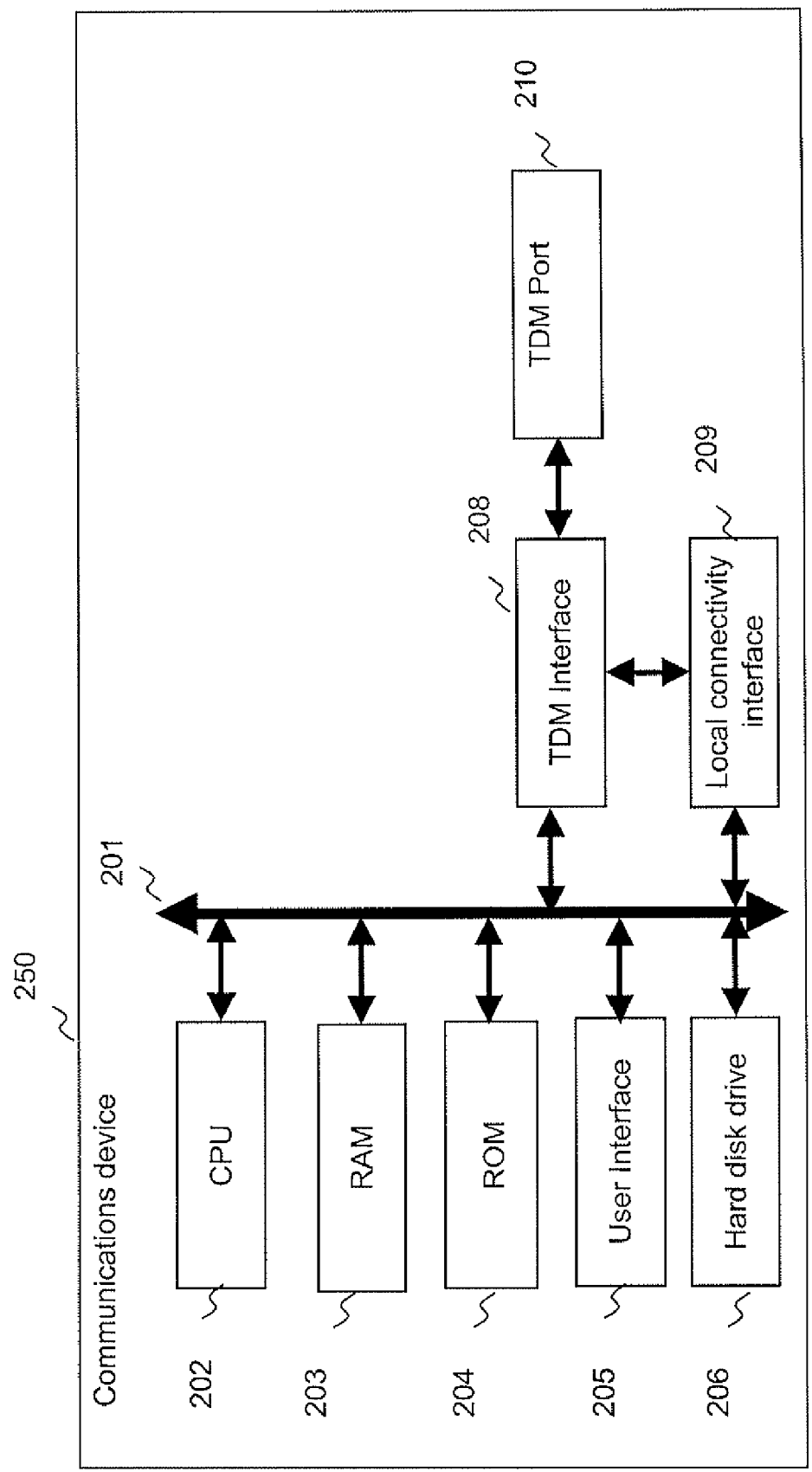
FIG. 2b shows a drawing of an adaptor-type device

Referring to FIG. 2b, a description is provided of a communications device 250 which integrates an embodiment of the invention as implemented in the adaptors TA2, TA3, TA4, TA5 and TA6 respectively referenced 182 to 187 in FIGS. 1a and 1b.

This communications device 250 differs from the device 200 described here above in that it does not have any switching module 207 and therefore has only one communications port 210 and only one interface module 208 enabling an exchange of information through the TDM network.

Here below in this document, no distinction shall be made between the terms "adaptor" and "adaptor-type" communications device as described with reference to this figure.

Figure 3:
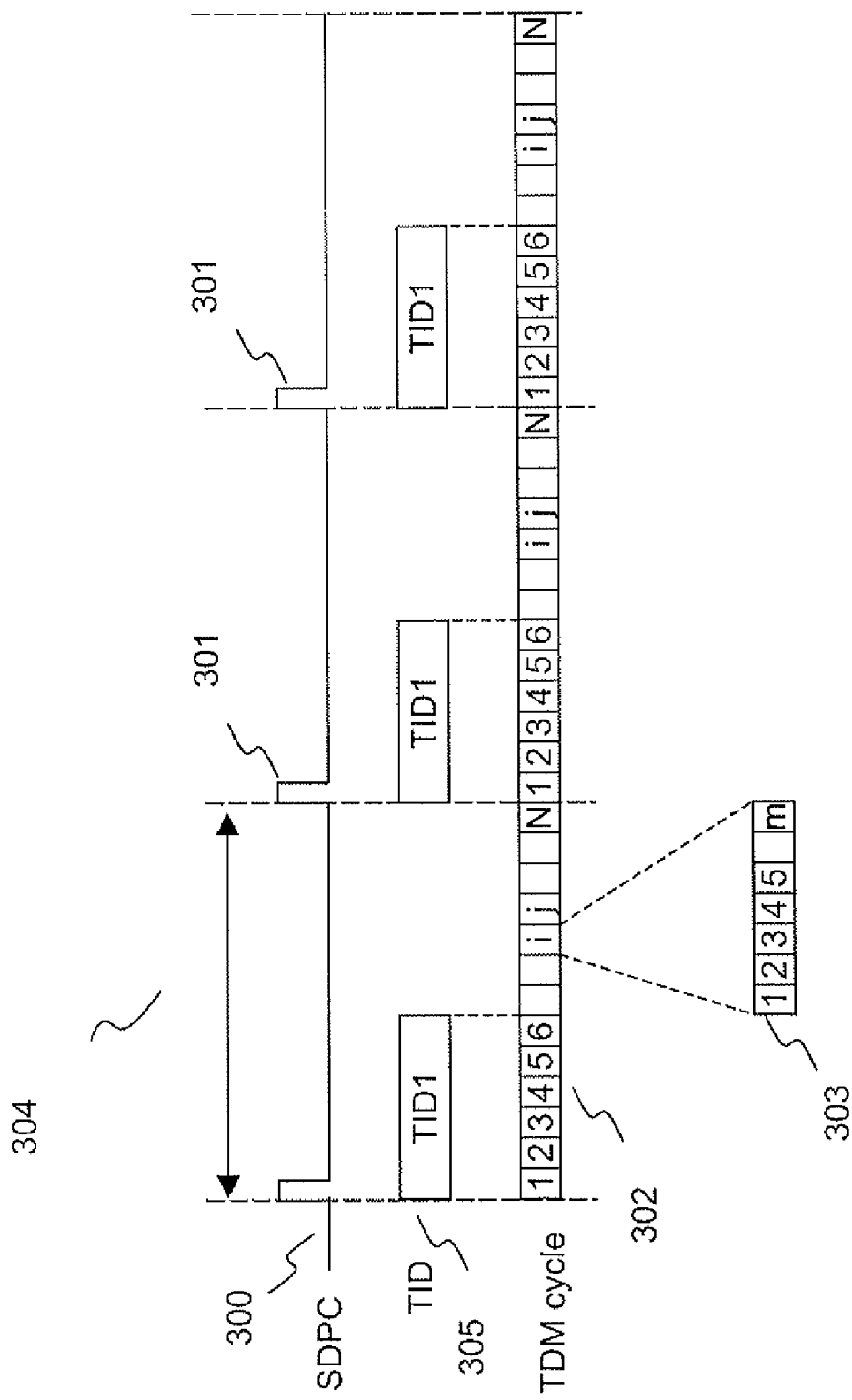
FIG. 3 is a diagram illustrating the TDM cycle

Referring to FIG. 3, a description is provided of the mechanisms governing the working of the communications in a network known as a TDM network.

Thus, at each communications port of the TDM network, the entire available bandwidth is divided into synchronous virtual channels (VC) 302 whose samples 303 which are identically sized M are interlaced in time thus forming a TDM sequence also called a TDM cycle for which the samples are numbered 1 to N. Each of these virtual channels has a input or output sense of communications assigned to it: these senses of communication will also be referred to in terms of reading and writing. The bandwidth thus allocated to each virtual channel is therefore constant and characterized by the frequency of appearance of the TDM cycle and the size of the samples.

By way of an example, for an 8 kHz TDM cycle, namely a cycle with a period 304 of 125 μs (microseconds) and a sample of size of 48 bits, each virtual channel therefore offers a bandwidth of 384 Kbps (kilobits per second). Thus, a TDM cycle with 1024 virtual channels offers a total bandwidth of 384 Mbps (megabits per second).

The SDPC signal 300 (SDPC=synchronous data processing cycle) marks the appearance of the first symbol representing the first sample of the TDM cycle. The period 304 of this signal is equal to the period of the TDM cycle.

The TID envelope 305 represents a set of virtual channels, which may or may not be consecutive, belonging to a communications tree identified by an identifier TID1 for a given communications port.

It must be noted that the switches SW1, SW2, SW3, SW4 and SW5 and the adaptors TA2, TA3, TA4, TA5 and TA6 are synchronized with one another. Thus, all the ports will start processing a new TDM sequence simultaneously.

Figure 4:
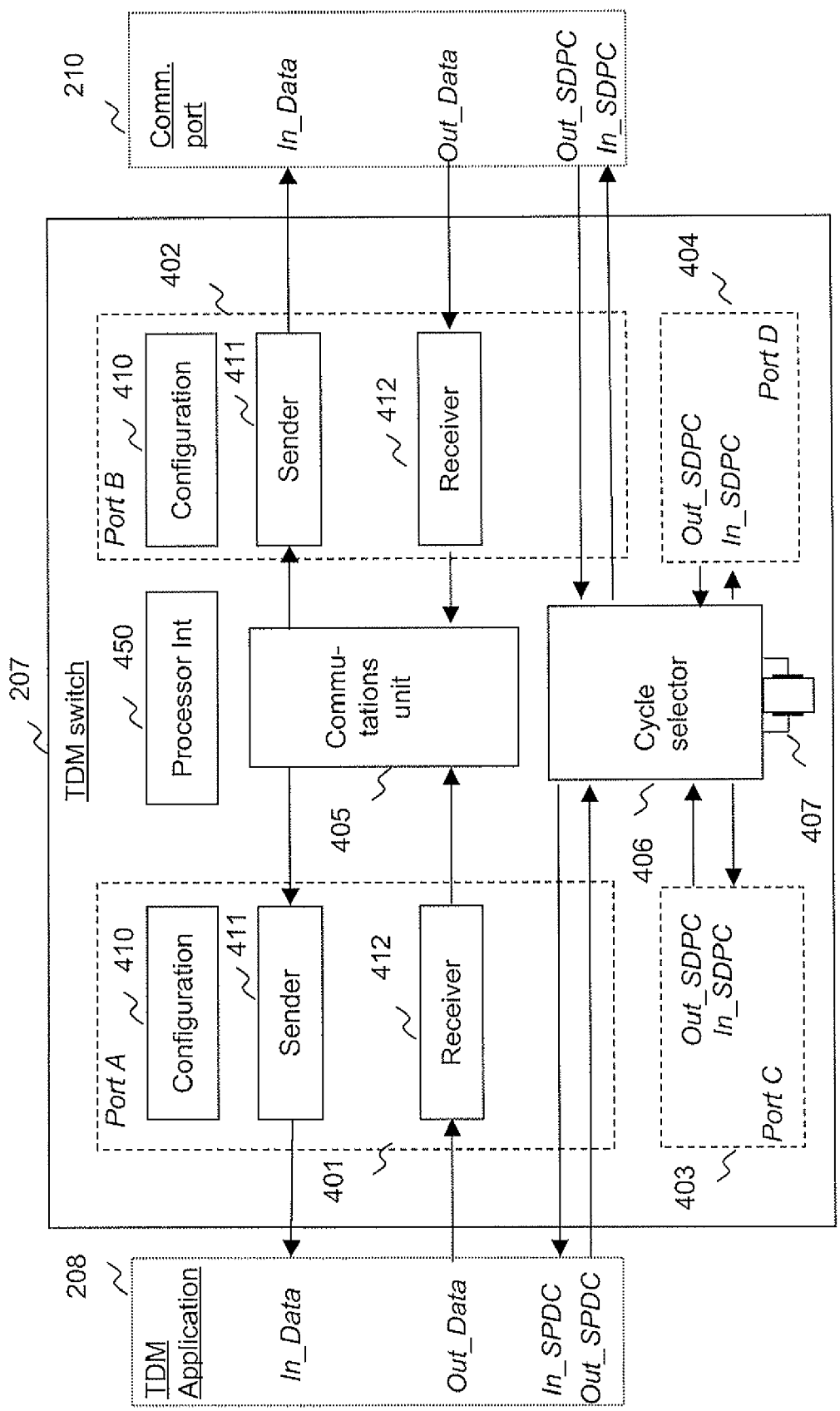
FIG. 4 is a block diagram illustrating a TDM switch

FIG. 4 provides a more detailed description of the TDM switch 207 by means of a block diagram. Thus, the TDM switch 207 consists of four ports A, B, C and D respectively referenced 401, 402, 403 and 404, each being connected to a switching unit 405 which for example could take the form of a shared data bus (not shown in the figure for the ports C and D). It must be noted that for reasons of clarity, the only ports shown in detail in this figure are the ports A 401 and B 402. The port A is for its part connected to the interface module with the application 208, the port B to the communications port 210, the ports C and D being connected to the communications ports 211 and 212 but not being shown in this figure.

A TDM selector referenced 406 is used to choose a reference clock which is either a locally generated signal 407 or an SDPC signal 300 coming from one of the ports A, B, C or D. The SDPC signal of each of the other ports will then be automatically controlled by this reference. In a TDM network, such as the one that supports the systems described with reference to FIGS. 1a and 1b, there will be one and only one TDM switch 207 whose reference TDM cycle will be the local clock 407. The term used then will be that of the reference clock distribution.

The operator chooses the configuration of the reference cycle selector 406 of each of the switches SW1, SW2, SW3, SW4 and SW5 through the user interface 205 using a program that is executed by this central processing unit 202 which is used to modify the configuration of a TDM switch through the interface 450. In one alternative, an automatic determining of the clock distribution could be implemented by those skilled in the art using a spanning tree algorithm.

Each of the ports A, B, C and D referenced 401 to 404 comprises configuration elements 410 which may be static or dynamically modifiable. Among these configuration elements 410, we may cite routing information used to set up communications networks through the switching unit 405, the sense of communication of each of the virtual channels as well as information on the implementation of an embodiment of the invention.

Each port furthermore comprises a reception module 412 and a sending module 411 suited to communicating with the module with which it is attached in complying with the mechanisms described with reference to FIG. 3.

Thus, during a TDM cycle (between two pulses 301 of the SDPC signal 300), each port will receive data (Out_Data) that the reception module 412 will store before it is transferred to one or more ports. At the same time, the sending module 411 of each port will write data (In_Data) which it has preliminarily stored in the communications port, in the present case 208 for the port A and 210 for the port B, to which it is attached. However, this will be explained in greater detail with reference to FIG. 6.

Figure 5:
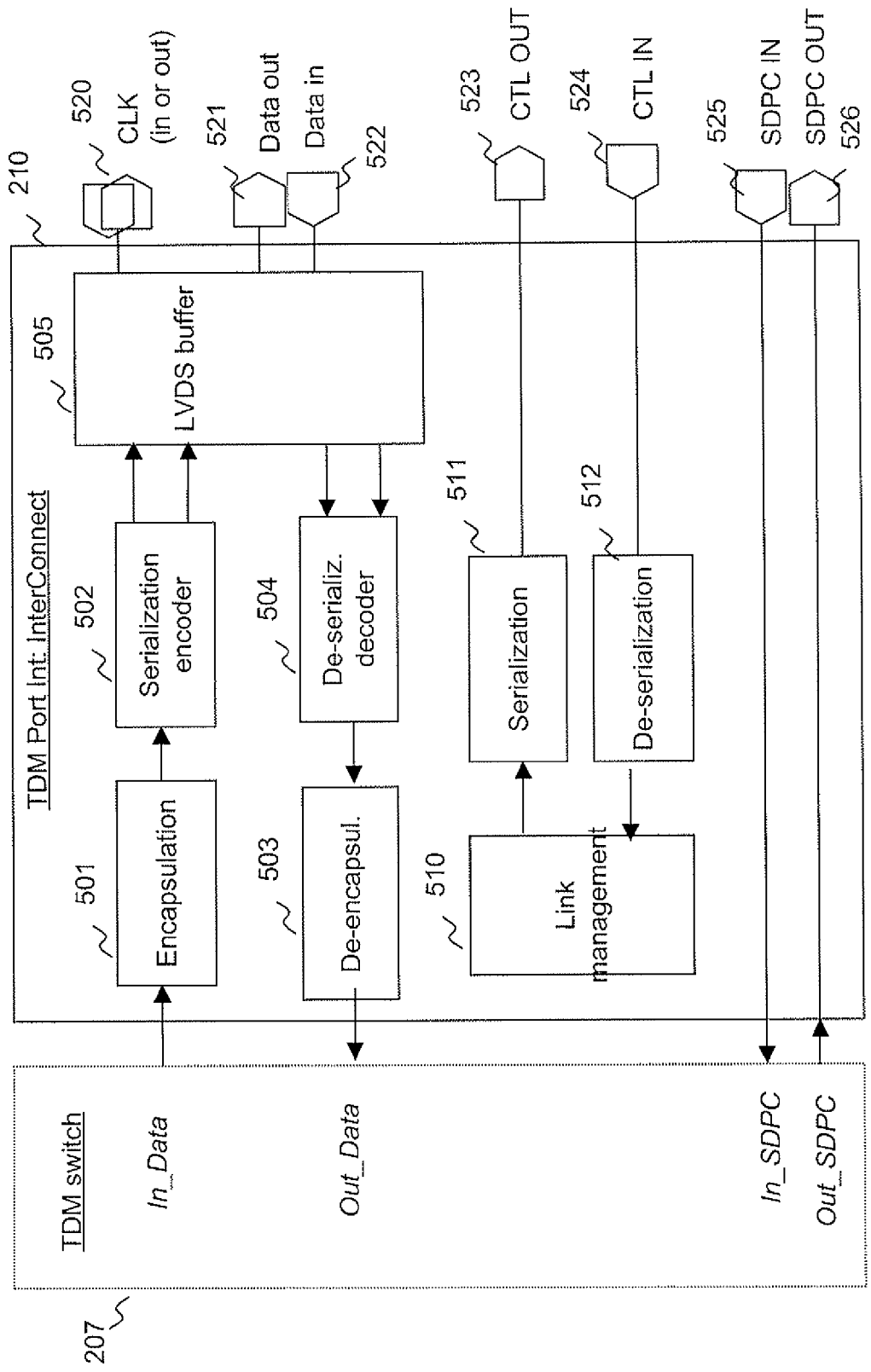
FIG. 5 is a block diagram illustrating an InterConnect-type communications port

The block diagram of FIG. 5 shows an example of a communications port 210 which will be used to set up a serial interconnection link (also known as InterConnect).

An interconnection link (or InterConnect) such as the interconnection links 152, 154 and 155 introduced in FIGS. 1a and 1b is obtained by setting up a point-to-point link between two communications ports using a cable which conveys the signals 520 to 526 on a short distance (a few meters at most).

Thus, the data elements coming from the switch 207 are, initially at the step 501, encapsulated to form a data frame and then serialized and encoded for example with an 8 b/10 b encoding (eight payload bits corresponding to ten bits after encoding) at the step 502. The data thus shaped is then transferred to an LVDS (Low Voltage Differential Signaling) sending buffer register 505 thus offering high-bit-rate transmission through the signal Data_out 521.

The reception chain of the communications port 210 carries out the inverse successive operations, namely the reception of data through this signal Data_in 522 in the LVDS reception buffer register 505, an inverse operation called a de-serialization and decoding operation 504 and finally an extraction of data at the step 503 before this data is re-sent to the switch 207 according to the mechanisms described with reference to FIG. 3.

It must be noted that the signal 520 of the LVDS buffer register 505 is the CLK serialization clock signal or bit clock of the data sent or received on the signals 521 and 522. The signal 520 can be configured at input or at output depending on the clock distribution configured by the operator as specified here above with reference to FIG. 4.

Furthermore, this communications port has a signaling module 510 to exchange checking data with the remote port with which it is interconnected. A serializing operation 511 is applied before transmission to the signal CTL_OUT 523. At reception, the reverse operation (de-serialization) 512 is performed on the signal CTL_IN 524 for processing by the signaling module 510. This signaling module contributes especially to the broadcasting of information for the distribution of the clock signal in the network and enables a check to see whether the link between the two communications ports in a point-to-point connection is still active.

Finally, the communications port 210 enables the issuing of the reference clock signal of the TDM cycle 300 coming from the switch 207 on the output signal 526 SDPC_OUT and also enables the issuing to this same switch 207 of the reference clock signal of the TDM cycle 300 received from the remote terminal through the SDPC_IN signal 525. Thus, depending on the clock distribution configured by the operator, only one of these two signals is taken as a reference.

Figure 6:
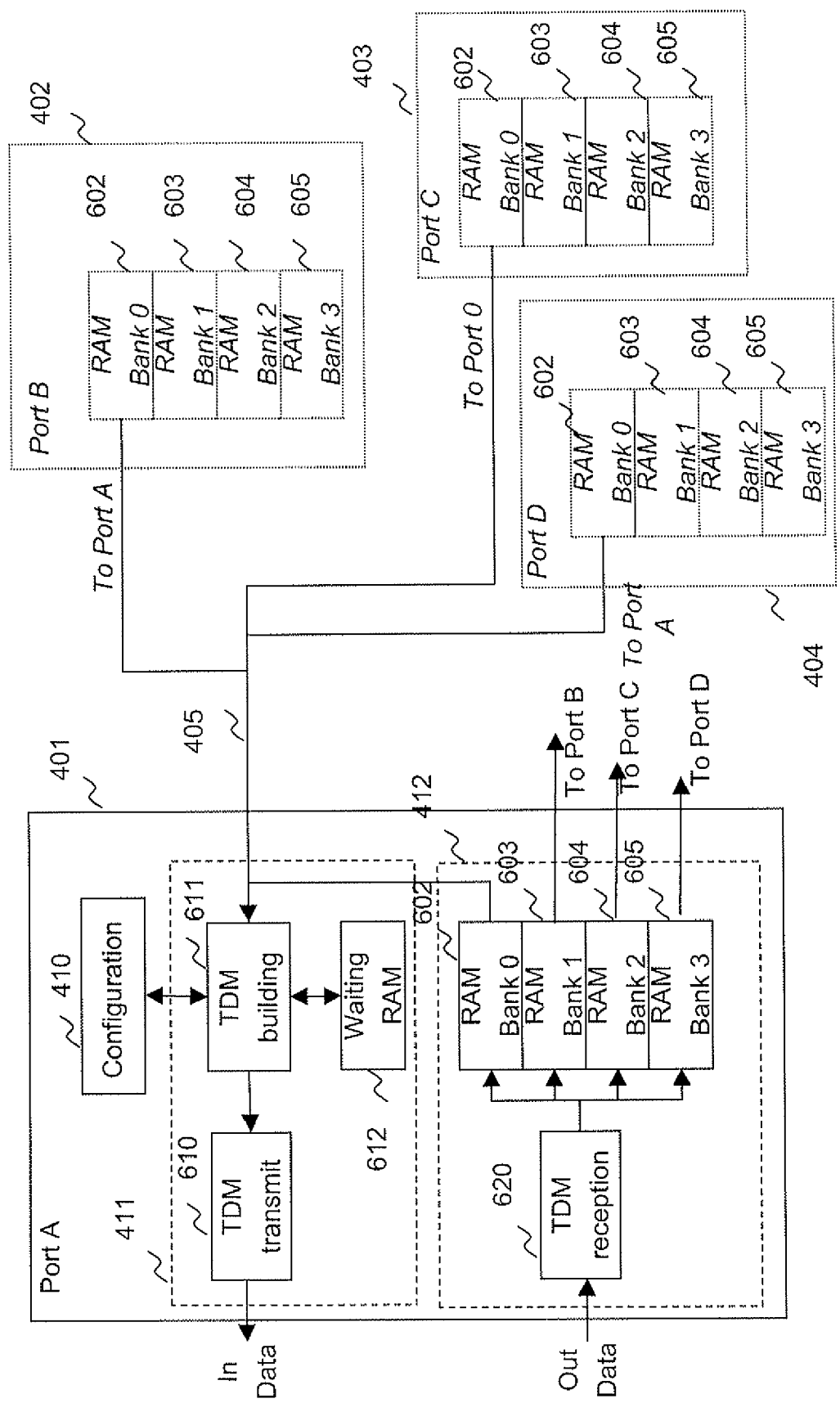
FIG. 6 is a block diagram illustrating the data paths of the TDM switch

Referring to the block diagram presented in FIG. 6, a more detailed description is given of the mechanisms of communication through the switching core 405 between the ports A, B, C and D, respectively 401, 402, 403 and 404, of the TDM switch 207. Thus, as can be seen in this figure, each TDM switch port 207 has four memory banks 602, 603, 604 and 605 each of them being itself divided into two zones enabling simultaneous reading and writing.

Thus, the reception module 412 has a module 620 which writes these received pieces of data to the four memory banks 602 to 605.

The sending module 411 for its part has a TDM sequence fabrication module 611 whose method is described with reference to FIG. 9 which, according to information in the configuration table of the port described with reference to FIG. 8 and contained in the configuration memory 410 will access the memory bank reserved for it in each of the ports A, B, C and D of the TDM switch 207. The data pertaining to the virtual channels thus read then form a new TDM sequence. All that the write module 610 then has to do is to write this new sequence during the next TDM cycle. Thus, by way of an example in FIG. 6, it can be seen that the bank 602 of each port is accessible through the TDM sequence building module 611 of the port A.

Furthermore, again according to information contained in the configuration memory 410, the TDM sequence fabrication module 611 can store the data pertaining to a virtual channel in the waiting memory 612 when it is sought to carry an operation of balancing the latency as described in this embodiment of the invention. The module 611 can also re-read the data elements pertaining to a virtual channel which it has preliminarily stored in order to forward them to the write module 610 thus introducing a controlled latency between reception on a first port of the TDM switch and sending on a second port.

It can be noted that information coming from the port A can be re-sent on the port A. This means therefore that the information received through a first virtual channel can be re-transmitted to a second virtual channel within a same port.

In order to guarantee constant transfer times, the set of write and read cycles in the memory banks enabling the transfer of the data pertaining to a TDM sequence must be done within a time smaller than the period of the TDM cycle.

Referring to FIGS. 7a, 7b and 8, a description is provided of the configuration tables of a switch and of each of these ports as well as the table of the communications trees of a switch for implementing an embodiment of the invention.

Thus, FIG. 7a shows a first configuration table 700 of a TDM switch 207 formed by three information fields, a port identifier 701, a piece of information on the delay of the link 702 expressed in numbers of TDM cycles and a third field 705 which may comprise a list of identifiers of communications trees for which the pieces of information are contained in a second table 710.

In one alternative where the latency of the connection links or the sub-networks is not symmetrical, the configuration table of the switch 750 will comprise a piece of information for the delay associated with the uplink traffic 701 and a second piece of information for the delay associated with the downlink traffic 703 instead of the link delay field 702.

FIG. 7b describes the table of the communications tree 710 of a TDM switch 207. For each communications tree, this table contains a unique identification field 711, a state field 712, an operations mode field 713 which may take the values "N-to-1" or "1-to-N" representing the application aimed at by this communications tree (for example the applications of FIGS. 1a and 1b). For each communications tree, there is a field 714 comprising the list of input and output ports of the stream or streams belonging to the communications tree as well as typical field 715 and a delay field 716 characterizing this port. It must be noted that a value zero in the delay field 716 means that the information contained in this field is not up to date.

The typical field characterizing a port may take one of the following values: "south", "north", "root" or "leaf". The root is the convergence port (N-to-1 type application or operating mode) or the divergence port (1-to-N type application or operating mode) in the communications tree, i.e. it occupies a central, hub position while a leaf is a termination port in this same tree, i.e. it is a situated on the periphery side.

Looking at it from a position situated on a TDM switch, a "north" port is a port of this switch which is the end of a link that is the starting point of a path between the switch and the root; conversely, a "south" port is a port of this switch which is the end of a link that is the starting point of at least one path between the switch and at least one leaf, i.e. in a direction opposite to the convergence or divergence terminal. It will be noted that the "south" port of this switch is connected to a "north" port of another switch (that is more peripheral in the communications tree) or is connected to a leaf port.

In the context of this embodiment of the invention, a communications tree may have only one root.

Figure 9:
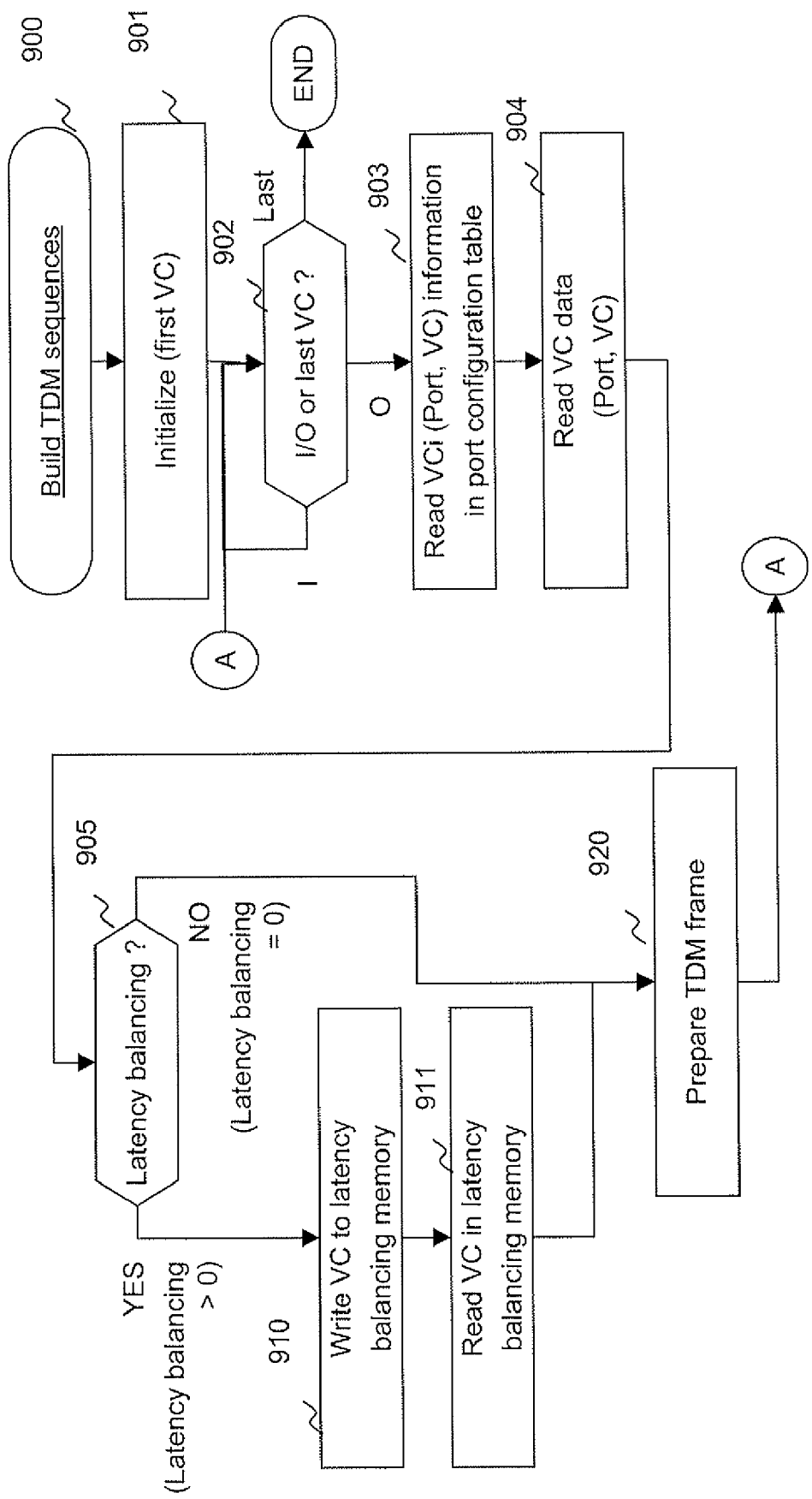
FIG. 9 is a flowchart illustrating the fabrication of a TDM sequence

FIG. 8 describes the configuration table 800 of a port of the TDM switch 207 used to build a TDM sequence with reference to FIG. 9. This table 800 has a first virtual channel identification field 801 whose sense of communication is specified by the field 802, the point of origin being specified in the source port field 803 and source virtual channel field 804. Finally, there is a field 805 indicating whether this virtual channel belongs to a communications tree as well as a field 806 representing the delay (or additional latency) to be applied to this virtual channel following the execution of the operation for balancing latency implemented in this embodiment of the invention.

FIG. 9 illustrates the building of a TDM sequence 900 for each communications port of a switch type communications device.

A first step 901 is used to initialize the sending memory in which the TDM sequence will be built according to the information contained in the configuration table 800 of the communications port and then the information 802, 803, 804 and 806 associated with the first virtual channel (VC) is extracted.

Then the operation passes to the test 902 in which a check is made to see if all the virtual channels VCs have been processed, in which case the procedure ends. This means that the TDM sequence is ready for sending at the next TDM cycle. If it is assumed that the virtual channel VC is configured at input with respect to the field 802, then the pieces of information of the next virtual channel VC are extracted and the test 902 is repeated.

If it is assumed that the virtual channel VC is configured at output, the operation passes to the step 903 in which the pieces of information contained in the fields 803 and 804, giving the location of the information to be inserted in the TDM sequence, are extracted. Using this information, at the step 904 therefore, the data of the virtual channel VC of the appropriate port will be read before the operation passes to the test 905 in order to determine whether a balancing delay must be applied (where the value of the field 806 is different from zero).

If the answer is negative, at the step 920 the data read at the step 904 is written to the sending memory to form a virtual channel VC of the TDM sequence and then the operation returns to the test 902 to process the next virtual channel VC.

If the response is positive, at the test 905 the data read at the step 904 is written to the latency balancing memory at the step 910 and then a reading will be done of the data preliminarily written in a previous sequence and corresponding to the balancing delay contained in the field 806 of the configuration table of the communications port 800. This is therefore a functioning of a FIFO type memory of adjustable length. At the next step, the data read at the step 911 is then read in the sending memory to form a virtual channel VC of the TDM sequence and then the operation returns to the test 902 to process the next virtual channel VC.

The process of balancing the communications tree is described with reference to FIGS. 10 to 15. These figures illustrate the flowcharts used for determining, for each node of the communications tree, a maximum value of latency associated with each path going from said node up to leaf nodes in the direction opposite to the convergence terminal (or divergence terminal depending on the type of application, whether 1-to-N or N-to-1) and more particularly the propagation and processing of the DELAY_QUERY and PORT_DELAY messages. These flowcharts are used furthermore for the application, to these links of the node in the direction opposite the convergence terminal (or divergence terminal depending on the type application, 1-to-N or N-to-1), of an additional latency balancing corresponding to a difference between the maximum value of latency of the link considered and the maximum value of latency that is the greatest value among said determined maximum values of latency (and more particularly the propagation and processing of the PORT_DELAY and BALANCING_CORRECTION messages).

Figure 10:
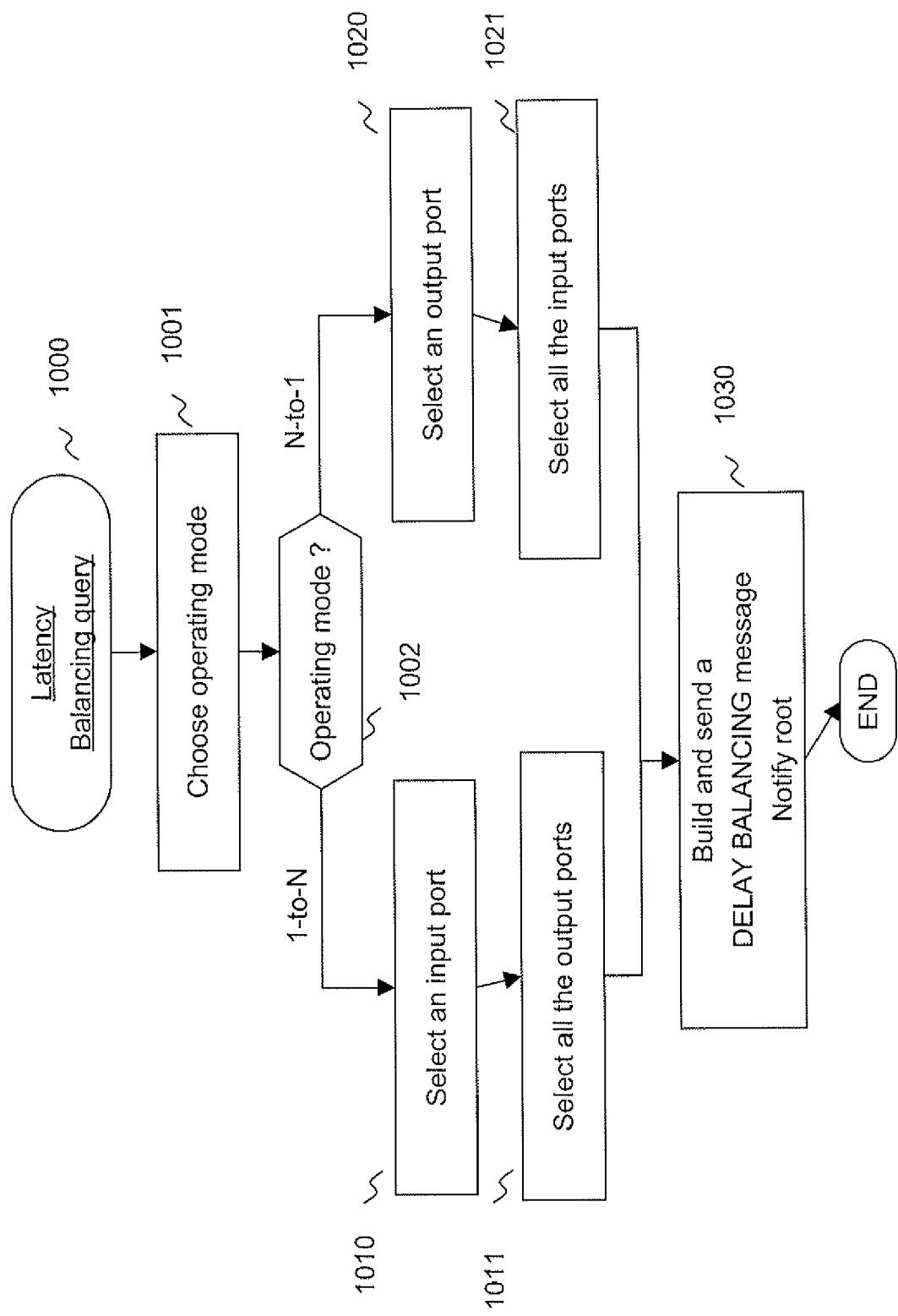
FIG. 10 is a flowchart illustrating the interaction with the operator

The flowchart of FIG. 10 illustrates the starting by the operator of the latency balancing process 1000 in a communications tree.

The operator in a first step 1001 chooses an operating mode (namely 1-to-N or N-to-1) by means of the user interface 205 of one of the adaptors 182 to 186 or one of the switches 171 to 175.

At the step 1002, a check is made on the operator's choice in order to present him with the appropriate interface. If he has chosen the 1-to-N operating mode, an interface enables him to successively select, at the step 1010, the input port from which the information stream to be broadcast has come and then in a step 1011, the set of output ports (to which the terminals are connected) for which there will be applied a balancing, in the communications tree thus formed, of the latency with reference to the input port. The input port will be the root of the communications tree and the output ports will be the leaves of this communications tree. The operation then goes to a step 1030.

Making the other assumption where the operator has chosen the N-to-1 operating mode, an interface will allow him to successively select, in a first step 1020, an output port at which all the streams of the communications tree will converge and then, in a second step 1021, all the input ports for which a balancing will be applied in the communications tree thus formed of the latency with respect to the output port. The operation then passes to the step 1030.

In one alternative to the input and output port selection steps 1010, 1011, 1020 and 1021, the operator can select a communications tree which will have been pre-configured by an administrator of the system.

At the step 1030, a DELAY BALANCING type notification is sent to the root node, the goal of this notification being to initiate the latency balancing method in the communications tree formed after the selection of the input and output ports by the operator.

Figure 11:
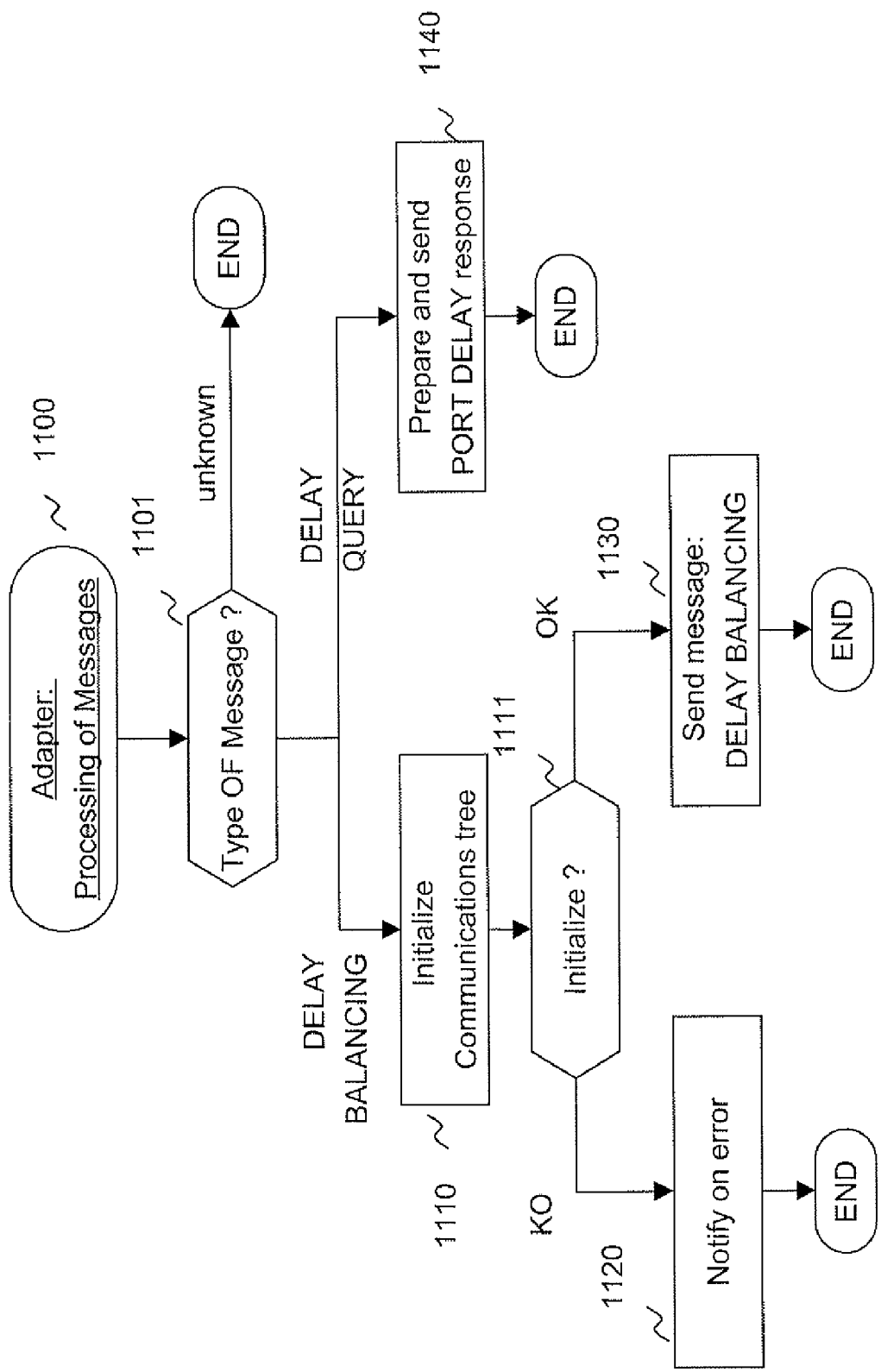
FIG. 11 is a flowchart for the processing of messages by an adaptor

FIG. 11 illustrates the method 1100 of processing messages received by a communications device described in FIG. 2b and implemented in the adaptors TA2, TA3, Ta4, TA5 and TA6 respectively referenced 182 to 187 in FIGS. 1a and 1b.

Thus, the message processing method 1100 starts with a step of analysis 1101 of the message received. If this message is not recognized, the processing will be terminated.

If the message is identified as being a DELAY BALANCING type message, the operation passes to a step 1110 for initializing a new communications tree. It must be noted that, apart from the information needed to set up connections, this message contains an identifier of the communications tree under construction.

In this step 1110, the communications device 250 sets up the virtual channels between the root and the leaves, i.e. the communications device 250 updates the routing information in the configuration tables 800 of the ports of each of the switches 200 on the path between the root and the leaves, namely the field 801, 802, 803, 804 and 805 thus forming a communications tree. The term then used is that of setting up a dynamic connection (or SVC: Switched Virtual Connection).

The operation then passes to the test 1111 for checking to see if the initialization has been properly performed. If the answer is negative, an error is reported to the operator at the step 1120 and then the processing operation is terminated. If the answer to the test 1111 is affirmative, the notifying message DELAY BALANCING notification message is sent to the switch type communications device 200 to which the adaptor 250 is attached by a connection link or a sub-network.

This DELAY BALANCING message is then interpreted as a command for activating a balancing of the communications tree. In a preferred embodiment of the invention, this latency balancing activation command for the communications tree will then be propagated from the relay node to the leaf nodes in the form of a DELAY_QUERY type message used to determine path latencies. This latency balancing activation command for the communications tree can also be propagated through the communications tree, from the root node to the leaf nodes, using a dedicated message.

If, at the step 1101, the identified message is of the DELAY_QUERY type, then the operation passes to the step 1140 in which a message comprising the latency value introduced by the adaptor 250 is prepared before sending it to the switch type communications device 200 to which the adaptor 250 is attached by a connection link or by a sub-network.

It must be noted that, in a first alternative implementation of an embodiment of the invention, the steps 1110, 1111 and 1120 can be implemented by the switch type communications device attached to the adaptor.

In a second alternative branch, in which the communications channels are preferably set up by an administrator or at initialization of the communications device, the term used then is permanent virtual circuits (PVC), then the steps 1110, 1111 and 1120 do not exist.

Figure 12:
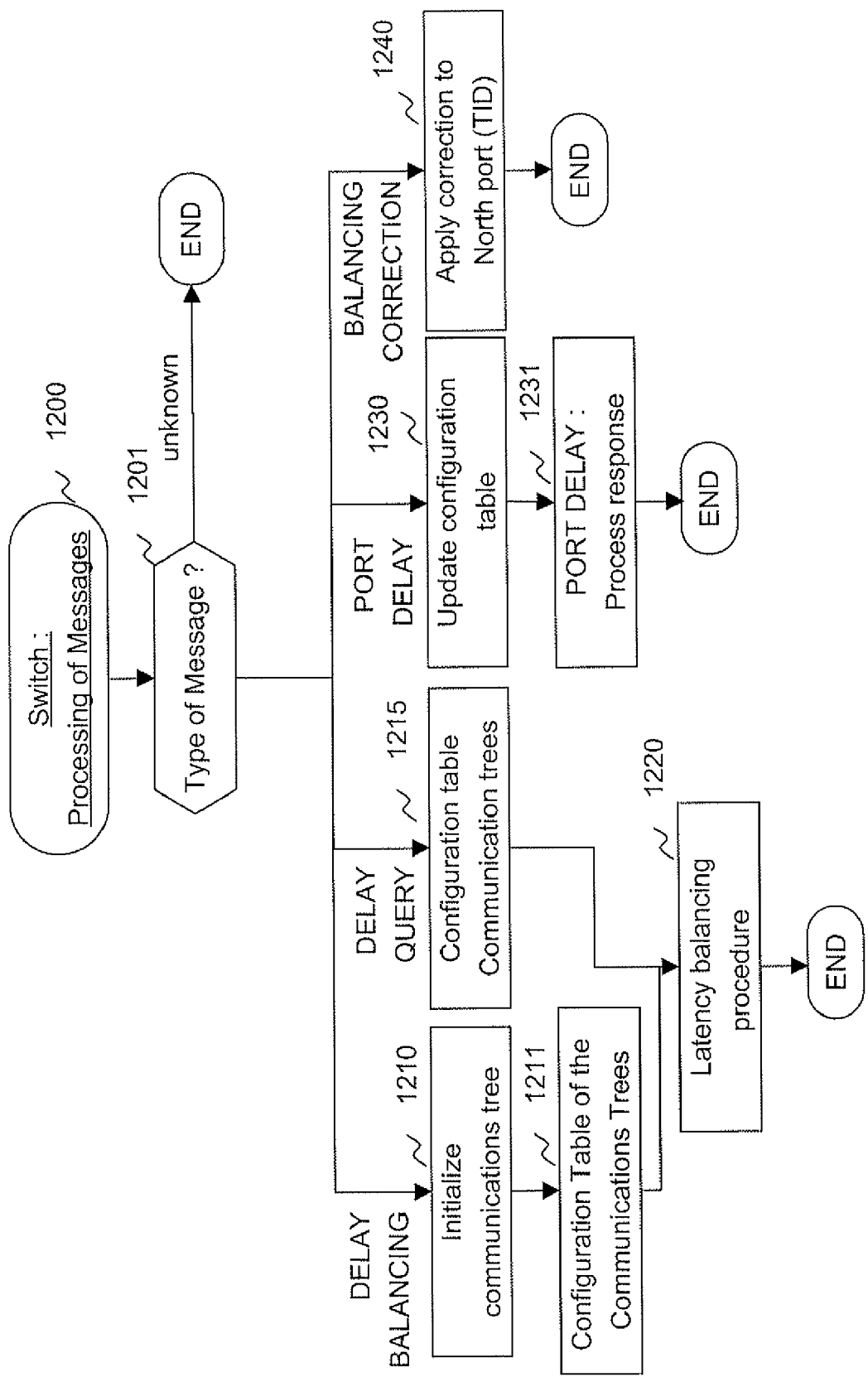
FIG. 12 is a flowchart for processing messages by a switch

FIG. 12 illustrates the method 1200 of processing messages received by a communications device 200 described in FIG. 2a and implemented in the switches SW1, SW2, SW3, SW4 and SW5 respectively referenced 171 to 175 in FIGS. 1a and 1b.

The method of processing messages 1200 then starts with a step of analysis 1201 of the message received. If this message is not recognized, the processing is terminated.

If not, should the message be identified as being DELAY BALANCING type message, the operation passes to a step of initializing 1210 a new communications tree. It must be noted that this message is received by the root switch (or root node) of the communications tree and furthermore contains information needed to set up connections as well as the identifier of the communications tree under construction and the operating mode chosen by the operator.

In the step 1210, if the initialization has not been done preliminarily by an adaptor, the switch sets up the virtual channels between the root and the leaves, i.e. the routing information in the configuration tables of the ports 800 of each of the switches 200 on the paths between the root and the leaves is updated, i.e. the fields 801, 802, 803, 804 and 805 thus forming the communications tree. The term used then is the setting up of a dynamic connection (or SVC: switched virtual connection).

When the connections are set up, each of the switches 200 on the paths between the root and the leaves thus add the identifier of the communications tree under construction to the list of identifiers 705 of the communications trees of each port 701 taking part in its preparation in the configuration table of the switch 700.

If a problem appears in this initialization step, then an error is reported to the operator before terminating the processing operation.

Naturally, this type of DELAY BALANCING type message can be come from another apparatus connected to the communications system but it can also have been produced by the switch itself and in this example, the DELAY BALANCING type message is a signaling or "report" or an internal procedure call.

It must be noted that in one alternative in which the communications channels are pre-established either by an administrator of the system, i.e. the administrator updates the configuration tables 800, or at initialization of the communications device on the basis of information contained in the configuration tables 800, the term used then is permanent virtual circuits (PVC: Permanent Virtual Circuits), then the step 1210 does not exist.

If the previous initialization phase has been properly terminated, the processing continues to pass to the step of configuration 1211 of the table of the communications trees 710 of the switch. In this step, an entry 711 is created in the configuration table of the communications trees 710 or else an update is performed on the entry corresponding to the identifier of the communications tree 711 for which a latency balancing is performed. Thus, for the entry whose identifier has been received in the DELAY BALANCING message, the operating mode contained in the received message is written to the field 713 and then, the "root" communications port and the "south" or "leaf" communications port or ports among the communications ports 401, 402, 403 and 404 of the switch 200 participating in the preparation of the communications tree are specified in the field 715, their field 716 being reset at zero pending their updating.

Then, at the step 1220, the iterative process of balancing the latency of the communications tree is started by calling up the switch balancing procedure which shall be described in detail with reference to FIG. 13.

The processing of the DELAY BALANCING type message is then terminated.

If, during the test 1201, the identified message is of the DELAY QUERY type, the operation passes to the step 1215. It must be noted that this message which is received by an intermediate switch or leaf of the communications tree comprises the identifier of the communications tree being balanced and the operational mode chosen by the operator.

In this step 1215, an entry 711 is created in the configuration table for configuring the communications tree 710 or else an update is done on the entry corresponding to the identifier of the communications tree for which a latency balancing is done. Thus, for the entry whose identifier is extracted from the DELAY QUERY message, the operational mode contained in the received message is recorded in the field 713 and then the communications port by which the message was received is positioned in the field 715 at the value "north". Among the other communications ports of the switch 200 participating in the communications tree, those connected to an adaptor 250 or to an interface module 208 are "leaf" type communications ports and therefore have a value of the typical field 715 configured with the value "south". These leaves being of the "south" type have their typical field configured with the value "south". The field 716 of these communications ports is reset at zero pending their updating.

Following the step 1215, the operation passes to the step 1220 where the iterative process of balancing the latency of the communications tree is continued by calling up the switch balancing procedure which shall be described in detail with reference to FIG. 13.

The processing of the delay query type message is then terminated.

If, during the test 1201, the identified message is of the PORT DELAY type, the operation passes to the step 1230. This step is used, for the "south" communications port having received this response, to update the "port delay" field 716 of the table for configuring the communications tree 710 of the switch with the value of the latency used to attain a leaf port identified in this message.

Then, the operation passes to the step 1231 in which the processing operations following the reception of all the responses coming from the "south" type communications ports are carried out. This operation is described in greater detail with reference to FIG. 14.

The processing of the PORT DELAY type message is then terminated.

If, during the test 1201, the identified message is of the BALANCING CORRECTION type, the operation passes to the step 1240. This step is used for the updating, in the configuration table of the "north" type communications port through which the message has arrived, of the field 806 of the configuration table 800 for the entries whose identifier TID of the field 805 is extracted from the received message.

The processing of the BALANCING CORRECTION type message is then terminated.

Referring to FIG. 13, a description is provided of the procedure 1300 illustrating the consolidation of the latencies of the communications ports executed in a switch 200.

A first step 1301 is used for the retrieval in the table of the communications trees of the list of communications ports 714 participating in the communications tree whose identifier TID 711 is under processing. Then, the first communications port of this list is selected. Then the operation passes to the test 1302 where a check is made on the type of communications port selected. If the communications port 210 considered is of the "leaf" type, then in a step 1310 the "port delay" field 716 of the configuration table of the communications port 210 is updated with the value defined by construction which is a function of the communications port 210 enabling a connection link to the adaptor type communications device or of the latency of the adaptation module of the application 208 and of the latency of the switching module 207. Then, the operation passes to the test 1330.

If, during the test 1302, the communications port is of the "south" type then, in a step 1320, a delay query type message is prepared. This DELAY QUERY type message contains the identifier of the communications tree which is sent through this communications port to the communications device that is directly connected to it before passage to the test 1330.

Thus, a maximum value of latency by successive nodes is determined, in working back from the leaf nodes to the root node, the intermediate nodes propagating a DELAY_QUERY type message on each of its "south" ports, this propagation of a message being completed when the message reaches a leaf node.

If the communications port is not of the "leaf" or "south" type, the operation passes to the test 1330.

At the test 1330, a check is made to see if all the ports associated with the communications tree have been processed. If the answer is negative, then the next communications port in the list of communications ports 714 participating in the communications tree, whose identifier TID 711 is in the process of being processed before passing to the test 1302, is selected.

If the check is positive at the test 1330, the operation terminates with the step 1400 described in greater detail with reference to FIG. 14 in which the value of the supplement of latency to be provided to obtain a balanced communications tree is determined when all the necessary information on the delays 716 is available.

Referring to FIG. 14, we shall determine the value of the supplement of latency to be provided to obtain a balanced communications tree when all the necessary delay information 716 is available.

Thus, this procedure 1400 starts with a test 1401 in which a check is made to see if, for the communications tree identified by its TID 711, all the "south" or "leaf" type communications ports have been brought up to date, i.e. whether the port delay field 716 in the configuration table of the communications trees 710 has a value different from zero.

If the answer to the test 1401 is negative, i.e. if the switch is awaiting a response for this port, then the processing is terminated.

If the answer to the test 1401 is positive, i.e. if the operation has updated the information on delays contained in the field 716 of each of the "south" type communications ports for the communications tree under processing, the operation passes to the step 1402. Then, among these pieces of information, the operation determines the maximum delay before passing to the step 1500 in which the supplement of latency to be provided in order to balance the communications tree is determined and applied. The step will be described in greater detail with reference to FIG. 15.

Then, the operation passes to the test 1404 in which a check is made to ascertain that the switch is the root node. If the answer is positive, the processing operations associated with the communications tree identified by the current TID is terminated.

If the answer is negative, the operation passes to the step 1405 in which a PORT DELAY type message is prepared. This PORT DELAY type message contains the identifier of the communications tree being processed and the maximum delay being determined at the step 1402 to which the delay of the link 702 of the north port as well as the intrinsic latency of the switch has just been added. In the example of a link having an asymmetrical delay, an embodiment of the invention will use the uplink delay information 703 in the case of an N-to-1 type communications tree and the downlink delay information 704 in the case of a communications tree of the 1-to-N.

Thus, the supplement of latency or latencies by successive nodes are applied by working back from the leaf nodes to the root node, the intermediate nodes propagating the PORT_DELAY type of message on their "north" port, the propagation of a message coming to an end when the message reaches the root node.

Then, the processing is terminated by the sending of this message to the communications device directly connected to the "north" port.

Referring to FIG. 15, we shall determine the value of the correction to be applied in order to balance the communications tree.

This procedure 1500 starts with a step 1501 of extracting, from the communications trees table 710, the list of "south" type communications ports of the list 704 of communications trees identified by the current TID in the field 701 of the communications trees table 710.

At the test 1502, if the last communications port of the extracted list has been processed, the operation ends. If not, the first element of the list containing the information elements 713, 714, 715, 716 pertaining to a "south" type communications port is extracted and the operation passes to the step 1503.

In this step 1503, a check is made to determine the correction that needs to be made to the balancing of the communications tree. To this end, from the maximum delay determined at the step 1402 of FIG. 14, the value of the delay 716 of the communications port contained in the previously extracted information is deducted. This difference gives the value of the latency correction to be made to the virtual channels of the communications tree traveling through this communications port.

When this correction value has been determined, it still has to be determined or applied. This determining starts by the test 1504 in which the operating mode for the communications tree under processing is tested.

If the operating mode is the 1-to-N mode, the operation passes to the step 1510 in which the value of the balancing delay field 806 of the configuration table of the "north" communications port of the communications tree TID is modified. Following this operation, the operation returns to the test 1502 to process the next communications port in the list.

If the operating mode is the N-to-1 mode, the operation passes to the step 1520 where a message is being prepared of the BALANCING CORRECTION type containing the identifier of the communications tree and the value of the correction preliminarily computed at the step 1502 and then the operation passes to the step 1521 in which the message is transmitted to the communications device connected to this "south" communications port. Following this operation, the operation returns to the test 1502 to process the next communications port in the list.

FIGS. 16 to 19 will be used to provide explanations, through the examples of the communications systems of FIGS. 1a and 1b, of the configurations obtained following the application of an embodiment of the invention for the balancing in latency of the communications tree in order to obtain a synchronous presentation of the information.

FIG. 16 provides an illustration, in the form of a graph, of the communications system described with reference to FIG. 1a, the TDM switches being represented by circles with bars and the adaptors being represented by triangles. In addition, squares whose contours are plotted in dots and dashes show the delays induced (expressed in numbers of TDM cycles) by the different elements of the network: the TDM switches 171 to 175 and the virtual interconnection links 111, 112, the InterConnect type interconnection links 152, 154, 155 and finally the sub-networks 120, 121 and 122. For example, the switch SW2 referenced 102 introduces a latency of two TDM cycles, the virtual interconnection link 111 introduces a delay of four TDM cycles and the sub-network 120 introduces a delay of 16 TDM cycles.

It must be noted that these latency values introduced by these elements of the network are constant and linked to the underlying technology. Thus, each switch knows its latency and each of its communications ports knows the delay associated with its connection link.

FIG. 17 illustrates the typing (field 715) of the communications ports of the switches of the communications system present in FIG. 1a in the context of the application of an embodiment of the invention and in addition to the delays shown in FIG. 16. It must be noted that, for the application of an embodiment of the invention to the system presented in FIG. 1b, this leads to an identical result for the typing of the communications ports. It will be noted that the "north" type ports are denoted by "N", the "south" type ports are denoted by "S", that the "root" type port is denoted by "N" and is underlined and finally that the "leaf" type ports are denoted by "S" and are underlined.

FIG. 18 illustrates the result obtained after implementation of an embodiment of the invention for the communications system of FIG. 1a, in specifying, for each switch, the greatest value among the maximum latency values determined on the "south" ports (indicated in circles with bars representing the TDM switches) and the correction made to the "north" port of the switches (indicated by underlining in proximity to the "north" ports of the TDM switches). It will be noted that the delays introduced in FIG. 16 and represented by squares whose contours are plotted in dots and dashes are here too represented identically.

FIG. 19 illustrates the result obtained after implementation of an embodiment of the invention for the communications system of FIG. 1b, in specifying, for each switch, the greatest value among the maximum latency values determined on the "south" ports (indicated in circles with bars representing the TDM switches) and the correction made to the "south" ports (indicated by underlining in proximity to the "south" ports of the TDM switches). It will be noted that the delays introduced in FIG. 16 and represented by squares whose contours are plotted in dots and dashes are here too represented identically.

In a second particular embodiment of the invention, for latency balancing, the information undergoing a supplement of delay related to the supplement of latency added is stored temporarily in the reception module 412 instead of the sending module 411. Then, the TDM sequence fabrication mechanism at output 611 described with reference to FIG. 9 is simplified with the removal of the steps 905, 910 and 911.

Referring to FIG. 20, a description is given of a switch type communications device whose information storage memory for storing information be delayed in the context of a latency balancing operation is situated in the reception module of each communications port.

It can be seen that the latency balancing memory 612 is attached to a TDM sequence fabrication module 2300 of the communications port considered.

This module 2300 implements a variant of the procedure described with reference to FIG. 9. Thus, the branch I conditions (for the incoming virtual channels VCs) and O (for the outgoing virtual channels VCs) of the test 902 are inverted (there is no passage to the next step except for the incoming virtual channels VCs) and the step 903 is eliminated.

Thus, at the step 904, a reading is made in the virtual channels VCs received from the reception module 620 before passage to the test 905.

Finally, the TDM sequence thus fabricated is transferred at the step 920 to the memory banks 602 to 605 instead of being transmitted in the module 610.

In this embodiment, FIG. 19 is thus slightly modified in that the conditions of branching to the test 1505 1-to-N and N-to-1 respectively to the steps 1510 and 1520 are inverted.

The FIGS. 21a to 22b shall be used to provide explanations, through examples of communications system of FIGS. 1a and 1b, of the configurations obtained following the application of an embodiment of the invention when the supplement of latency is applied in a switch type architecture having available a buffer memory for latency adjustment at the level of the input ports (of the switch).

FIG. 21a illustrates the result obtained after implementing an embodiment of the invention for the communications system of FIG. 1a in the second embodiment in specifying for each switch the greatest value among the maximum values of latency determined on the "south" ports (indicated in the circles with bars representing the TDM switches) and the correction made to these switches (indicated by underlining in the vicinity of the "south" ports of the TDM switches). It will be noted that the delays introduced in FIG. 16 and represented in squares whose contours are plotted in dots and dashes are here again represented identically.

FIG. 21b illustrates the result obtained after implementing an embodiment of the invention for the communications system of FIG. 1b in the second embodiment in specifying for each switch the greatest value among the maximum values of latency determined on the "south" ports (indicated in the circles with bars representing the TDM switches) and the correction made to the "north" communications port of the switches (indicated by underlining in the vicinity of the "north" ports of the TDM switches). It will be noted that the delays introduced in FIG. 16 and represented in squares whose contours are plotted in dots and dashes are here again represented identically.

The invention claimed is:

1. A method for balancing a latency of transmission of at least one data content in a communications tree defined in a synchronous communications network, the communications tree comprising a root node to which there is connected a junction terminal which is a convergence terminal in the context of a capture application and a divergence terminal in the context of a broadcast application, the communications tree further comprising leaf nodes to which there are connected capture terminals in the context of a capture application and broadcast terminals in the context of a broadcast application, the root node and the leaf nodes being interconnected by intermediate nodes, the nodes being interconnected by links, wherein the method comprises the steps of:

determining, for each node of the communications tree, a maximum value of latency associated with each path going from said node up to leaf nodes in a direction opposite to the junction terminal, and applying to each link at a node, the link running from the node in the direction opposite to the junction terminal, a supplement of latency balancing that corresponds to a difference between the maximum value of latency of each link and a maximum value of latency which is the greatest value from among said determined maximum values of latency.

2. The method according to claim 1, wherein the steps for determining a maximum value of latency and for applying a supplement of latency balancing are performed by successive nodes, in working back from the leaf nodes to the root node.

3. The method according to claim 1, wherein the method further comprises a preliminary step of sending a command to said leaf nodes, from a root node, for activating latency balancing of the communications tree.

4. The method according to claim 1, wherein the method further comprises, in order to perform the step of determining a maximum value of latency, the steps of, from each intermediate node:

sending a query, on the node's links in a direction opposite to the convergence terminal or the divergence terminal, for obtaining said maximum value of latency; and sending a message comprising a maximum value of latency determined as a function of at least one response to said query or queries, said message being sent on the link from said node towards the convergence terminal or the divergence terminal.

5. The method according to claim 1, wherein to perform the step of applying a supplement of latency balancing, the method further comprises a step, for at least certain of the links, of applying the supplement of latency to a link output with regard to a direction of transmission of said content or contents.

6. The method according to claim 5, wherein to perform the step of applying a supplement of latency balancing, the method further comprises preliminary steps which, for a considered node of each of said certain links, are steps of determining the direction of transmission of said content and, depending on the determined direction of transmission, the steps of:

locally applying the supplement of latency balancing to said considered node, or sending a command for application of the supplement of latency balancing intended for the node interconnected to said node considered by the link.

7. The method according to claim 1, wherein to perform the step of applying a supplement of latency balancing, the method further comprises a step, for at least certain of the links, of applying the supplement of latency at a link input with regard to a direction of transmission of said content or contents.

8. A non-transitory computer-readable storage means, storing a computer program comprising a set of instructions that can be executed by a computer to implement a method for balancing a latency of transmission of at least one data content in a communications tree defined in a synchronous communications network, the communications tree comprising a root node to which there is connected a junction terminal which is a convergence terminal in the context of a capture application and a divergence terminal in the context of a broadcast application, the communications tree furthermore comprising leaf nodes to which there are connected capture terminals in the context of a capture application and broadcast terminals in the context of a broadcast application, the root node and the leaf nodes being interconnected by intermediate nodes, the nodes being interconnected by links, wherein the program comprises the steps of:

determining, for each node of the communications tree, a maximum value of latency associated with each path going from said node up to leaf nodes in a direction opposite to the junction terminal, and applying to each link at a node, the link running from the node in the direction opposite to the junction terminal, a supplement of latency balancing that corresponds to a difference between the maximum value of latency of each link and a maximum value of latency which is the greatest value from among said determined maximum values of latency.

9. A communication node of a synchronous communications network designed to undergo a latency balancing of transmission of at least one data content in a communications tree defined in a synchronous communications network, the communications tree comprising a root node to which there is connected a junction terminal which is a convergence terminal in the context of a capture application and a divergence terminal in the context of a broadcast application, the communications tree furthermore comprising leaf nodes to which there are connected capture terminals in the context of a capture application and broadcast terminals in the context of a broadcast application, the root node and the leaf nodes being interconnected by intermediate nodes, the nodes being interconnected by links, wherein the communication node comprises:

a memory and a processor;

determination means for determining a maximum value of latency associated with each path going from said node up to leaf nodes in a direction opposite to the junction terminal, and applying means for applying to each link at a node, the link running from the node in the direction opposite to the junction terminal, a supplement of latency balancing that corresponds to a difference between the maximum value of latency of each link and a maximum value of latency which is the greatest value from among said determined maximum values of latency.

* * * * *